US012171020B2

(12) United States Patent
Taherzadeh Boroujeni et al.

(10) Patent No.: US 12,171,020 B2
(45) Date of Patent: Dec. 17, 2024

(54) CONTENTION-FREE RANDOM ACCESS TRANSMISSION METHOD SELECTION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Wooseok Nam, San Diego, CA (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/405,851

(22) Filed: Aug. 18, 2021

(65) Prior Publication Data

US 2023/0059455 A1 Feb. 23, 2023

(51) Int. Cl.
*H04W 74/04* (2009.01)
*H04W 74/00* (2009.01)

(52) U.S. Cl.
CPC ......... *H04W 74/04* (2013.01); *H04W 74/006* (2013.01)

(58) Field of Classification Search
CPC ............................ H04W 74/04; H04W 74/006
See application file for complete search history.

(56) References Cited

U.S. PATENT DOCUMENTS

| | | | |
|---|---|---|---|
| 2015/0016312 A1* | 1/2015 | Li | H04W 74/006 370/280 |
| 2017/0141833 A1 | 5/2017 | Kim et al. | |
| 2019/0174546 A1* | 6/2019 | Jeon | H04W 74/006 |
| 2020/0137806 A1 | 4/2020 | Islam et al. | |
| 2021/0058971 A1* | 2/2021 | MolavianJazi | H04L 1/189 |
| 2021/0329704 A1* | 10/2021 | Yang | H04B 17/318 |
| 2022/0104280 A1* | 3/2022 | Yang | H04W 74/0841 |

OTHER PUBLICATIONS

International Search Report and Written Opinion—PCT/US2022/037492—ISA/EPO—Oct. 5, 2022.

* cited by examiner

*Primary Examiner* — Benjamin Lamont
(74) *Attorney, Agent, or Firm* — Holland & Hart LLP

(57) ABSTRACT

Methods, systems, and devices for wireless communications are described. A user equipment (UE) may communicate with a base station in a wireless communications system. The UE may perform a random access procedure to communicate with the base station. The base station may configure the UE with criteria for selecting a transmission mode. The UE may select a transmission mode for transmitting repetitions of physical random access channel (PRACH) transmissions according to current conditions satisfying the criteria. The criteria may be different based on a contention free random access (CFRA) procedure type or a purpose of the CFRA procedure. The transmission modes may include repetitions of PRACH on multiple random access channel (RACH) occasions, multiple component carriers (CCs), multiple frequency allocations of a same CC, superposition of preambles, different RACH resources, or different PRACH formats.

30 Claims, 15 Drawing Sheets

CONTENTION-FREE RANDOM ACCESS TRANSMISSION METHOD SELECTION

FIELD OF TECHNOLOGY

The following relates to wireless communications, including techniques for contention-free random access transmission method selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, UEs may perform random access procedures.

SUMMARY

The described techniques relate to improved methods, systems, devices, and apparatuses that support techniques for contention-free random access transmission method selection. Generally, the described techniques provide for a user equipment (UE) performing a random access procedure in communication with a base station in a wireless communications system. The base station may configure the UE with criteria for selecting a transmission mode. The UE may select a transmission mode from a set of transmission modes for transmitting repetitions of physical random access channel (PRACH) transmissions according to current conditions satisfying the criteria.

The criteria may be different based on a contention-free random access (CFRA) procedure type (e.g., synchronization signal block (SSB) based or channel state information reference signal (CSI RS) based random access) or a purpose of the CFRA procedure (e.g., beam failure recovery, handover, secondary cell group (SCG) set up, etc.). The criteria may include previous SSB or other channel measurements, UE power class, number of unsuccessful physical random access channel (PRACH) transmission attempts, or past measurements or CSI reports, or the like. The transmission modes may include repetitions of PRACH on multiple random access channel (RACH) occasions, multiple component carriers (CCs), multiple frequency allocations of a same CC, superposition of preambles, different RACH resources, or different PRACH formats.

A method for wireless communications at a user equipment (UE) is described. The method may include receiving, from a base station, control signaling including an indication of criteria for selection of a transmission mode from a set of transmission modes for transmission of a random access request message while the UE is in a connected mode with the base station, selecting the transmission mode from the set of transmission modes based on one or more conditions satisfying the criteria, and transmitting, according to the transmission mode and while the UE is in the connected mode with the base station, a set of repetitions of the random access request message.

An apparatus for wireless communications at a UE is described. The apparatus may include a processor, memory coupled with the processor, and instructions stored in the memory. The instructions may be executable by the processor to cause the apparatus to receive, from a base station, control signaling including an indication of criteria for selection of a transmission mode from a set of transmission modes for transmission of a random access request message while the UE is in a connected mode with the base station, select the transmission mode from the set of transmission modes based on one or more conditions satisfying the criteria, and transmit, according to the transmission mode and while the UE is in the connected mode with the base station, a set of repetitions of the random access request message.

Another apparatus for wireless communications at a UE is described. The apparatus may include means for receiving, from a base station, control signaling including an indication of criteria for selection of a transmission mode from a set of transmission modes for transmission of a random access request message while the UE is in a connected mode with the base station, means for selecting the transmission mode from the set of transmission modes based on one or more conditions satisfying the criteria, and means for transmitting, according to the transmission mode and while the UE is in the connected mode with the base station, a set of repetitions of the random access request message.

A non-transitory computer-readable medium storing code for wireless communications at a UE is described. The code may include instructions executable by a processor to receive, from a base station, control signaling including an indication of criteria for selection of a transmission mode from a set of transmission modes for transmission of a random access request message while the UE is in a connected mode with the base station, select the transmission mode from the set of transmission modes based on one or more conditions satisfying the criteria, and transmit, according to the transmission mode and while the UE is in the connected mode with the base station, a set of repetitions of the random access request message.

A method for wireless communications at a base station is described. The method may include transmitting, to a UE, control signaling including an indication of criteria for selection of a transmission mode from a set of transmission modes for transmission of a random access request message while the UE is in a connected mode with the base station, monitoring for a set of repetitions of the random access request message based on one or more conditions satisfying the criteria, and receiving, from the UE based on the monitoring, the set of repetitions of the random access request message in accordance with the transmission mode.

An apparatus for wireless communications at a base station is described. The apparatus may include a processor, memory coupled with the processor, and instructions stored in the memory. The instructions may be executable by the processor to cause the apparatus to transmit, to a UE, control signaling including an indication of criteria for selection of a transmission mode from a set of transmission modes for transmission of a random access request message while the UE is in a connected mode with the base station, monitor for a set of repetitions of the random access request message based on one or more conditions satisfying the criteria, and receive, from the UE based on the monitoring, the set of repetitions of the random access request message in accordance with the transmission mode.

Another apparatus for wireless communications at a base station is described. The apparatus may include means for transmitting, to a UE, control signaling including an indication of criteria for selection of a transmission mode from a set of transmission modes for transmission of a random access request message while the UE is in a connected mode with the base station, means for monitoring for a set of repetitions of the random access request message based on one or more conditions satisfying the criteria, and means for receiving, from the UE based on the monitoring, the set of repetitions of the random access request message in accordance with the transmission mode.

A non-transitory computer-readable medium storing code for wireless communications at a base station is described. The code may include instructions executable by a processor to transmit, to a UE, control signaling including an indication of criteria for selection of a transmission mode from a set of transmission modes for transmission of a random access request message while the UE is in a connected mode with the base station, monitor for a set of repetitions of the random access request message based on one or more conditions satisfying the criteria, and receive, from the UE based on the monitoring, the set of repetitions of the random access request message in accordance with the transmission mode.

DETAILED DESCRIPTION

A wireless communications system may support random access procedures including contention-free random access (CFRA) procedures. A base station may configure a user equipment (UE) with a preamble allocated to the UE for CFRA procedures. The UE may transmit a random access request message (e.g., Msg1) to the base station, the random access message including the allocated preamble, and the base station may transmit a random access response message including a resource grant for communication between the UE and the base station. However, if the base station does not successfully receive the random access message, then the CFRA procedure may fail or be delayed, resulting in a communications bottleneck due to the failed or delayed CFRA procedure. Improved reliability of CFRA procedures may result in improved coverage and system efficiency.

CFRA procedures may benefit from repetitions of physical random access channel (PRACH) transmissions (e.g., Msg1). A UE may transmit repetitions of a random access request according to one of many transmission modes (e.g., across multiple random access channel (RACH) occasions, using multiple component carriers or a single component carrier, superimposing preambles, on multiple beams, etc.). Explicitly instructing the UE as to which transmission mode to use for transmitting repetitions of a random access request message may result in excessive signaling overhead and increased latency. Instead, the base station may configure the UE with criteria for selecting a transmission mode. The UE may select a transmission mode for transmitting the repetitions according to current conditions satisfying the criteria.

The criteria may be different based on a CFRA procedure type (e.g., synchronization signal block (SSB) based or channel state information (CSI) reference signal (RS) based random access) or a purpose of the CFRA procedure (e.g., beam failure recovery, handover, SCG set-up, etc.). The criteria may include previous SSB or other channel measurements, UE power class, number of unsuccessful PRACH transmission attempts, or past measurements or CSI reports, or the like. The transmission modes may include repetitions of PRACH on multiple RACH occasions, multiple component carriers (CCs), multiple frequency allocations of a same CC, superposition of preambles, different RACH resources, or different PRACH formats.

Aspects of the disclosure are initially described in the context of wireless communications systems. Aspects of the disclosure are then described in the context of a system diagram and a process flow. Aspects of the disclosure are further illustrated by and described with reference to apparatus diagrams, system diagrams, and flowcharts that relate to techniques for contention-free random access transmission method selection.

Figure 1:
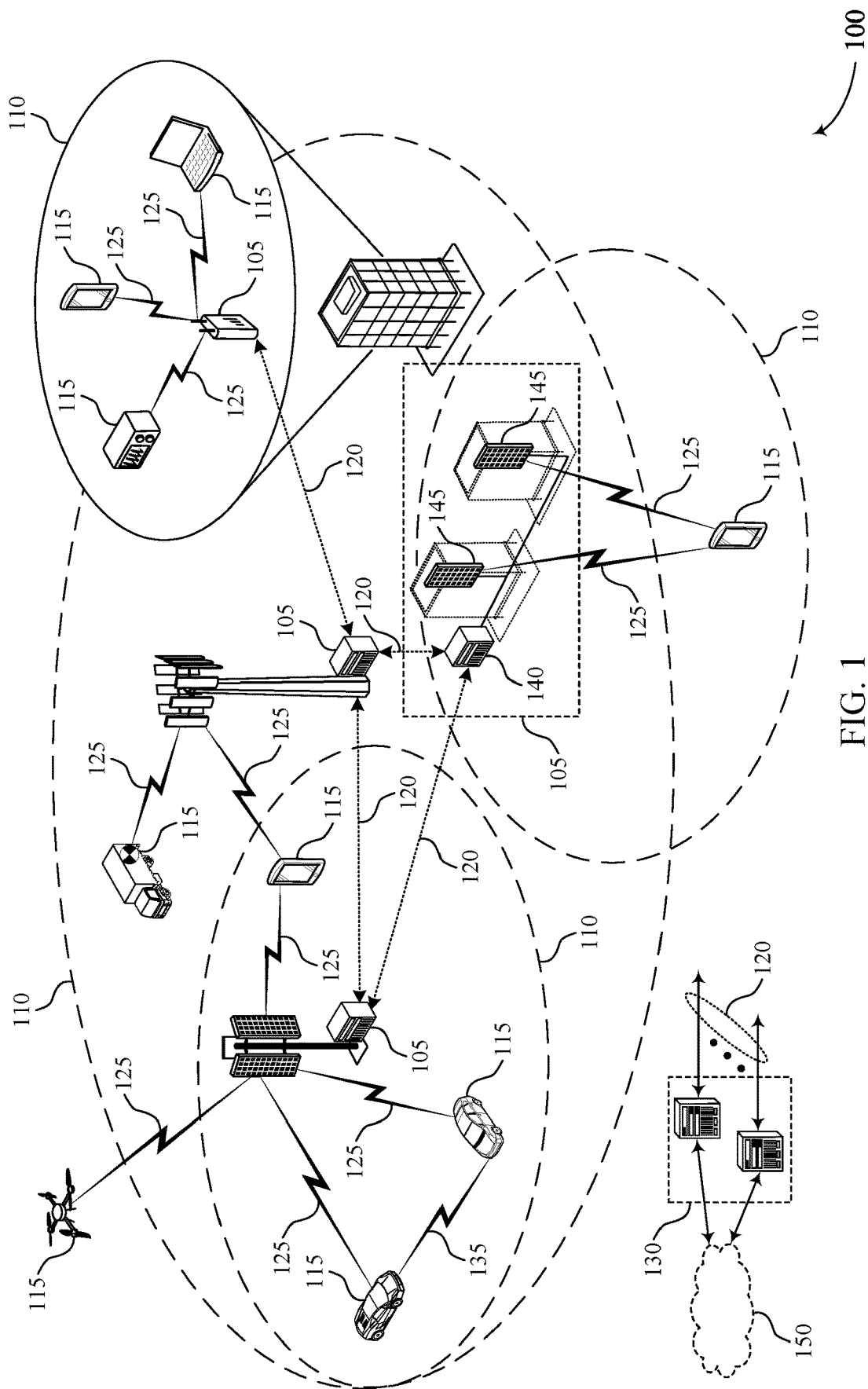
FIG. 1 illustrates an example of a wireless communications system that supports techniques for contention-free random access transmission method selection in accordance with aspects of the present disclosure.

FIG. 1 illustrates an example of a wireless communications system 100 that supports techniques for contention-free random access transmission method selection in accordance with aspects of the present disclosure. The wireless communications system 100 may include one or more base stations 105, one or more UEs 115, and a core network 130.

In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the UE 115 may perform random access procedures for establishing communications between the UE 115 and the base station 105. RACH procedures may be based on an SSB, channel state information reference signals (CSI RS), or any combination thereof. A RACH procedure may be a CFRA, or a contention based random access (CBRA). In examples of CFRA procedures, the network (e.g., via the base station 105) may assign a PRACH preamble to the UE 115 The UE 115 may calculate a random access radio network temporary identifier (RA RNTI) based on the assigned PRACH preamble. In some cases, the UE 115 may transmit a first random access message (Msg1) to the base station 105. The Msg1 may include the PRACH preamble message and the RA RNTI. The base station 105 may determine a random access response (RAR) based on the Msg1. The RAR may include an indication of resources for transmission on the uplink 210. The base station 105 may send a second random access message (Msg2) to the UE 115. The Msg2 may include the RAR. If the UE 115 successfully receives the RAR, the UE 115 considers the CFRA procedure successfully completed. If the UE 115 does not successfully receive the RAR, the UE 115 may consider the CFRA procedure unsuccessful and may retransmit Msg1 with higher transmit power. In examples of CBRA procedures, multiple UEs 115 may randomly select PRACH preambles and transmit the PRACH preambles to a base station 105 in a PRACH preamble message (e.g., Msg1). The base station 105 may send a second random access message (Msg2) to a UE 115 of the multiple UEs 115 (e.g., UE 115). The UE 115 may send back a physical uplink control channel (PUSCH) RRC setup request (Msg3) to the base station 105. The base station 105 may finish the CBRA procedure by sending an RRC contention resolution message (Msg4) to the UE 115.

A base station 105 may configure a UE 115 with criteria for selecting a transmission mode. The UE 115 may select a transmission mode for transmitting repetitions of physical random access channel (PRACH) transmissions according to current conditions satisfying the criteria.

The criteria may be different based on a contention-free random access (CFRA) procedure type (e.g., synchronization signal block (SSB) based or channel state information reference signal (CSI RS) based random access) or a purpose of the CFRA procedure (e.g., beam failure recovery, handover, secondary cell group (SCG) set up, etc.). The criteria may include previous SSB or other channel measurements, UE power class, number of unsuccessful PRACH transmission attempts, or past measurements or CSI reports, or the like. The transmission modes may include repetitions of PRACH on multiple random access channel (RACH) occasions, multiple component carriers (CCs), multiple frequency allocations of a same CC, superposition of preambles, different RACH resources, or different PRACH formats.

Figure 2:
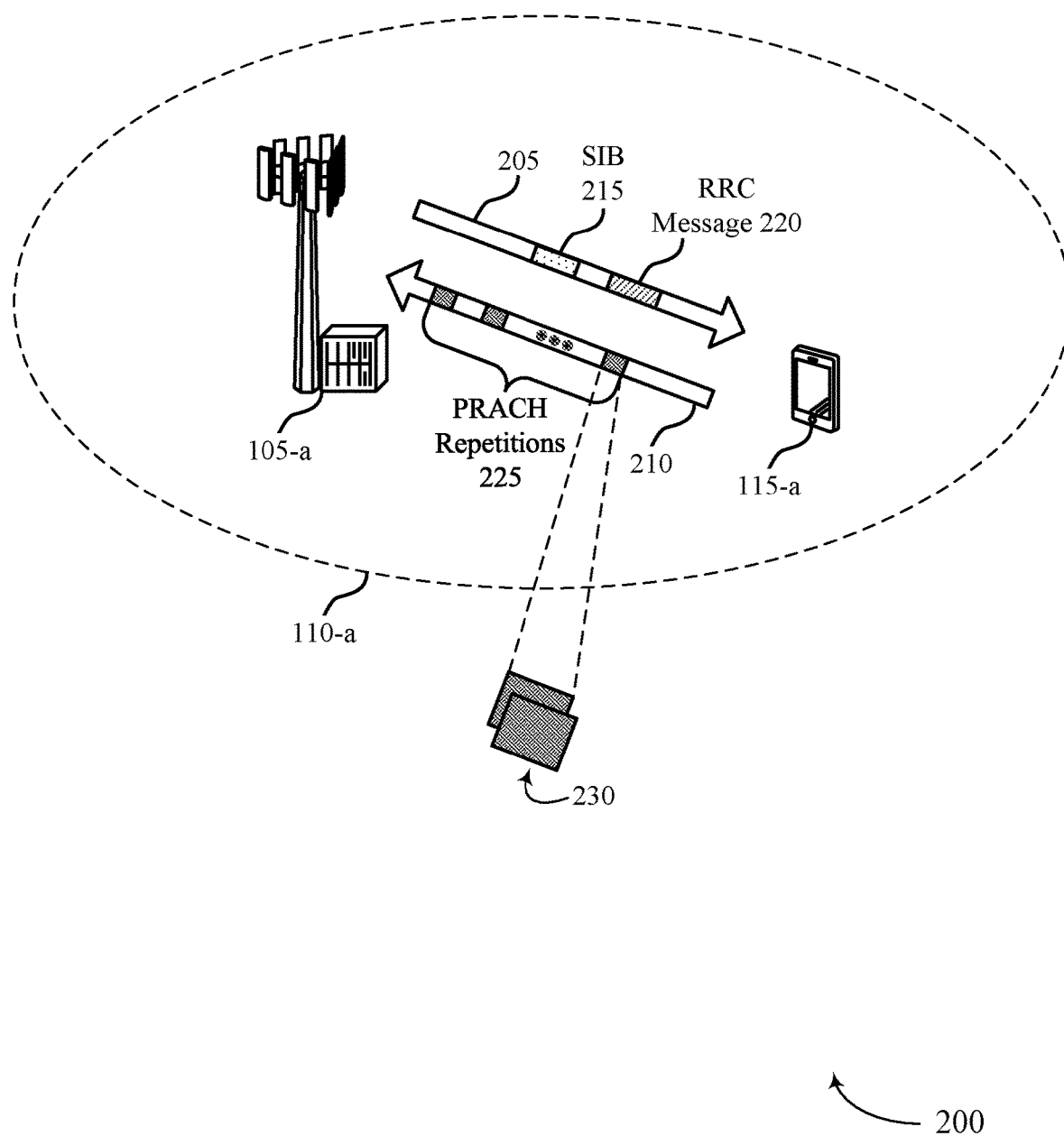
FIG. 2 illustrates an example of a wireless communications system that supports techniques for contention-free random access transmission method selection in accordance with aspects of the present disclosure.

FIG. 2 illustrates an example of a wireless communications system 200 that supports techniques for contention-free random access (CFRA) physical random access channel (PRACH) transmissions in accordance with aspects of the present disclosure. In some examples, the wireless communications system 200 may implement aspects of the wireless communications system 100. The wireless communications system 200 may include a UE 115-a and a base station 105-a, which may be examples of a UE 115 or a base station 105, as described herein with reference to FIG. 1. The UE 115-a and the base station 105-a may communicate with each other in the wireless communications system 200 via a downlink 205 and an uplink 210. The base station may serve one or more UEs 115 located within a geographic coverage area 110-a. The base station 105-a may use the downlink 205 to convey control and/or data information to the UE 115-a. The UE 115-a may use the uplink 210 to convey control and/or data information to the base station 105-a. In some cases, the downlink 205 may use different time and/or frequency resources than the uplink 210.

In some examples, the UE 115-a may establish communications between the UE 115-a and the base station 105-a (e.g., via the downlink 205 and the uplink 210). During a cell search procedure, the UE 115-a may measure synchronization signal blocks (SSBs) from the base station 105-a. The SSBs may include instruction on how to decode location of a system information block (SIB) 215. The SIB 215 may be an example of SIB type 1 (SIB1). The SIB 215 may show availability and scheduling of other system information (e.g., SIBs and random access channel (RACH) parameters).

In some cases, the UE 115-a may perform random access procedures for establishing communications between the UE 115-a and the base station 105-a. RACH procedures may be based on an SSB, channel state information reference signals (CSI-RS), or any combination thereof. A RACH procedure may be a CFRA, or a contention-based random access (CBRA). In examples of CFRA procedures, the network (e.g., via the base station 105-a) may assign a PRACH preamble to the UE 115-a. The UE 115-a may calculate a random access radio network temporary identifier (RA-RNTI) based on the assigned PRACH preamble. In some cases, the UE 115-a may transmit a first random access message (Msg1) to the base station 105-a. The Msg1 may include the PRACH preamble message and the RA-RNTI. The base station 105-a may determine a random access response (RAR) based on the Msg1. The RAR may include an indication of resources for transmission on the uplink 210. The base station 105-a may send a second random access message (Msg2) to the UE 115-a. The Msg2 may include the RAR. If the UE 115-a successfully receives the RAR, the UE 115-a considers the CFRA procedure successfully completed. If the UE 115-a does not successfully receive the RAR, the UE 115-a may consider the CFRA procedure unsuccessful and may retransmit Msg1 with higher transmit power.

In some examples the UE 115-a may operate in a connected mode (e.g., a radio resource control (RRC) connection) with the base station 105-a. For example, the UE 115-a may be connected to the base station 105-a through a previous random access procedure (e.g., CFRA procedure or CBRA procedure). The base station 105-a may have already configured a PRACH preamble for the UE 115-a. In some cases, the UE 115-a may perform the CFRA procedure in order to initiate beam failure recovery, handover to another base station 105, secondary cell group (SCG) setup, etc. However, conventional CFRA procedures (e.g., PRACH transmissions in a CFRA procedure) may suffer from potential coverage bottlenecks. For example, in some cases, quality of service constraints on existing CFRA procedures may detrimentally affect peak throughput, latency, and reliability, while reducing coverage and increasing power consumption for some devices. For example, if a base station 105 (e.g., the base station 105-a) in a connected mode (e.g., RRC connection) with a UE 115 (e.g., UE 115-a) never received Msg1 from the UE 115-a (e.g., due to the UE 115-a moving behind a barrier, interference, etc.), the base station 105-a may not determine a RAR to send to the UE 115-a. The UE 115-a may consider the CFRA procedure to be unsuccessful (e.g., the base station 105-a did not send a RAR) and the UE 115-a may retransmit Msg1 with higher transmit power. By retransmitting Msg1 with higher transmit power the UE 115-a may utilize additional system resources, and increase the likelihood of interference with other transmissions. Accordingly, it may be desirable to provide efficient coverage enhancement for CFRA RACH.

CFRA RACH procedures may benefit from repetitions of PRACH transmissions. If the UE 115-a transmits multiple repetitions of Msg1 (e.g., PRACH repetitions 225), the base station 105-a may be more likely to receive Msg1 despite interference, or partial failed reception or decoding, or the like. For CFRA procedures, because the UE 115-a is already RRC connected, the UE 115-a may identify a preamble that is already configured. Further, the base station 105-a may utilize the RRC connection to provide UE-specific configuration. In some examples of random access procedures (e.g., CBRA procedures), wireless devices may indicate Msg3 repetition requests via different preambles. However, for CFRA procedures, other forms of differentiation (for Msg3 repetition request) may be more useful (e.g., because the preambles for CFRA procedures are configured by the base station 105-a). Because the preamble for the UE 115-a is already known (e.g., configured), monitoring for uplink transmissions from the UE 115-a (e.g., via one or more transmission methods as described herein) such as the PRACH repetitions 225 may result in less overhead. Techniques efficient coverage enhancement for CFRA PRACH are described herein.

A base station 105-a may transmit configuration information included in an RRC message 220, a SIB 215, or any combination thereof, to a UE 115-a. In some examples, the base station 105-a may indicate the configuration information in the RRC message 220 (e.g., the configuration information in the RRC message 220 totally configures the criteria for transmission mode selection). In such examples, the UE 115-a may determine the criteria for selection mode by receiving the RRC message 220. In some examples, the base station 105-a may transmit an initial configuration in the SIB 215, and may update the configuration as necessary (e.g., periodically, as conditions change, or the like) via the RRC message 220. For instance, the SIB 215 may include a full set of initial values for the criteria. The RRC message 220 may indicate updated values, or offset values from the initial values of the criteria.

The configuration information may be specific to (e.g., based on) past CSI reports of the UE 115 a, SSB measurements or other past measurements. The configuration information may indicate criteria (e.g., rules for selection) that will determine a selected method of CFRA PRACH transmission (e.g., a transmission mode from a set of transmission modes). Each transmission mode of the set of transmission modes may define a transmission configuration (e.g., for transmitting one or more repetitions of Msg1).

The criteria for selection of CFRA PRACH transmission mode (and associated measurements for that criteria) may be different depending on whether CFRA RACH is based on SSB signals or CSI-RSs. The UE 115-*a* may select a transmission mode from the set of transmission modes based on one or more conditions that satisfy the criteria. In some cases, the conditions may include any one or multiple of: SSB measurements; UE power class; presence or number of unsuccessful PRACH transmission attempts; and/or past CSI reports or past CSI measurements, SSB measurements, or the like.

In some cases, the criteria may depend on the purpose of the CFRA procedure. For example, criteria may be different if the CFRA procedure is based on SSB, CSI-RS, or a combination thereof. In some examples, the criteria may be different for CFRA random access for beam failure recovery, handover procedures, or SCG set-up procedures, or the like.

In some cases, the selected transmission mode may include one or more of a set of different transmission modes. The set of different transmission modes may include: transmitting PRACH repetitions 225 on multiple RACH occasions (ROs), on multiple component carriers (CCs), multiple frequency allocations associated to the same CC, or any combination thereof. The set of different transmission modes may include transmitting the PRACH repetitions 225 using superposition of two or more PRACH preambles, different RACH resources (e.g., different PRACH preambles), and/or different PRACH formats.

The UE 115 a may transmit PRACH repetitions 225 (e.g., repetitions of a Msg1) according to the selected method of transmission. In some cases, the UE 115 a may repeatedly send, to the base station 105 a, repetitions of the Msg1 a set number of times, according to the configuration information. In some examples, the set of repetitions of the random access request message, PRACH repetitions 225, may include a preamble superimposed with a second preamble 230.

The described techniques (i.e., selection of CFRA PRACH transmission methods based on preconfigured rules) may be applicable depending on UE capability. If a UE 115 (e.g., UE 115-*a*) is not capable of performing the described techniques, a predefined default option CFRA PRACH transmission method may be used. For example, the UE 115-*a* may transmit, to the base station 105-*a*, capability information indicating that the UE 115-*a* supports techniques described herein (e.g., configuration of the criteria, and selection of the transmission mode based on the configured criteria).

Thus, the described techniques may be applied and expected only for UEs 115 that indicated the ability to perform the described techniques. If a UE 115 does not indicate the ability to perform the described techniques, a predefined default option (e.g., CBRA PRACH transmission) may be used. For instance, the UE 115-*a* may not support the techniques described herein (e.g., PRACH repetition transmission modes based on configured criteria and conditions). The base station 105-*a* may therefore refrain from transmitting the configuration information to the UE 115-*a* (e.g., via the SIB 215, the RRC message 220, or both). The UE 115-*a* may therefore transmit the Msg1 (e.g., with or without repetition) to the base station 105-*a* according to a default transmission mode. The default transmission mode may be one of the transmission modes of the set of transmission modes set as the default transmission mode. In some examples, the default transmission mode may not be included in the set of transmission modes (e.g., may not include any repetitions of Msg1). The base station 105-*a* may indicate (e.g., in the configuration information in the SIB 215 or the RRC message 220, or in a separate message) the default transmission mode. In some examples, the default transmission mode may be preconfigured, included in one or more standards documents, or any combination thereof.

Figure 3:
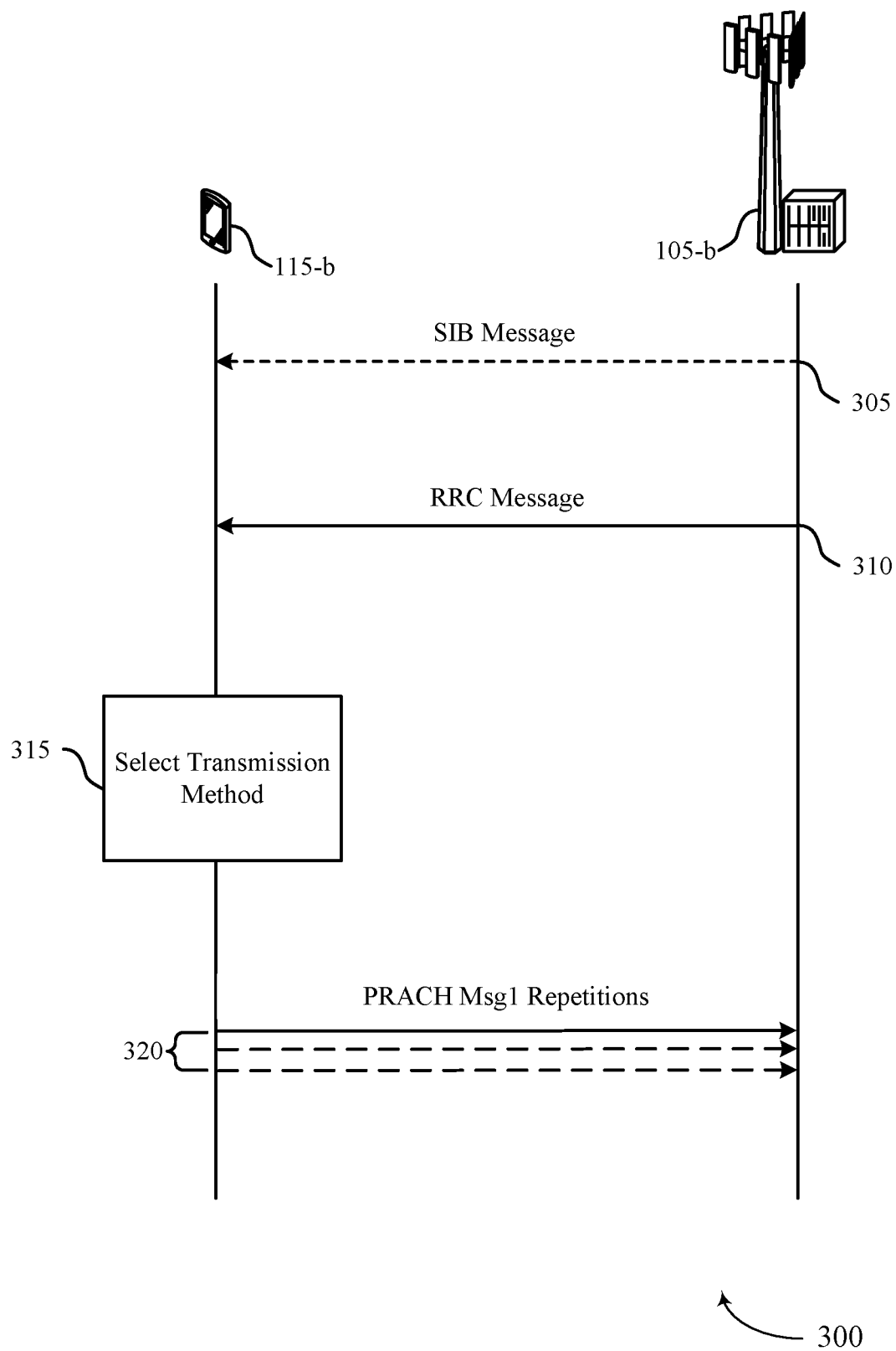
FIG. 3 illustrates an example of a process flow that supports techniques for contention-free random access transmission method selection in accordance with aspects of the present disclosure.

FIG. 3 illustrates an example of a process flow 300 that supports techniques for contention-free random access transmission method selection in accordance with aspects of the present disclosure. The process flow 300 may include a UE 115-*b* and a base station 105-*b*, which may be respective examples of a UE 115 and a base station 105 as described with reference to FIG. 1.

The UE 115-*b* may operate in a connected mode with the base station 105-*b*, for example, through a previous random access procedure (e.g., CFRA procedure, CBRA procedure, or the like). The UE 115-*b* may perform a beam sweep procedure to initiate beam failure recovery, handover to another base station 105, SCG setup, etc. In some examples, prior to receiving signaling at 305 or at 310, the UE 115-*b* may transmit and indication of its capability to support CFRA PRACH transmission methods and method selection, as described herein.

At 310, the base station 105-*b* may transmit an RRC configuration message to the UE 115-*b*. The configuration information may be based on past CSI reports, SSB measurements and/or past measurements. The configuration information may indicate criteria (e.g., rules for selection) that may determine a selected method of transmission. The RRC configuration message may totally determine the criteria for selection of the PRACH transmission method.

In some examples, the UE 115-*b* may use the RRC message to update criteria configured by a SIB message (e.g., SIB1). For example, at 305, the base station 105-*b* may transmit a SIB message (e.g., SIB1) to the UE 115-*b*. The SIB1 may include information relevant when evaluating if a UE 115 can access a cell, define scheduling for other system information, configuration information, etc. The SIB1 may be a respective example of SIB 215 as described with reference to FIG. 2. The SIB1 may also include an initial set of criteria for selecting a transmission mode from a set of transmission modes for Msg1 repetition. In such examples, the RRC message received by the UE 115-*b* at 310 may include one or more updates to the initial criteria. For example, the RRC message may include a new criteria (e.g., an entirely new set of criteria, conditions, or the like), or may include one or more updated values for the criteria, or may include one or more offsets to the initial values of the criteria, or any combination thereof.

At 315, the UE 115-*b* may select a PRACH transmission method based on the criteria for selection of the PRACH transmission method the UE 115-*b* received from the SIB1, the RRC configuration method, or any combination thereof. The UE 115-*b* may select a transmission mode based on one or more conditions that satisfy the criteria.

In some cases, the conditions may include one or more conditions of a set of different conditions. For example, a first condition may be SSB measurements, past CSI measurement reports, past measurements, or any combination thereof. The different measurements may include, but are not limited to, synchronization signal (SS) reference signal received power (RSRP), CSI-RSRP, new radio (NR) received signal strength indicator (RSSI), CSI-RSSI, secondary synchronization signal reference signal received quality (SS-RSRQ), CSI-RSRQ, SS signal-to-noise and interference ration (SS-SINR), CSI-SINR, etc. For example, a configured threshold on SS-RSRP may be modified by a correcting term which depends on the level of fluctuations of previous beam measurements and/or physical layer (e.g., layer 1) reports. Thus, more fluctuations of beam measurement may justify using more conservative thresholds for SS-RSRP. In such examples, the UE 115-b may select a first transmission mode (e.g., a higher number of repetitions over one or multiple CCS, or across multiple RA occasions, or the like) for poorer channel quality measurements (e.g., channel quality measurements that fail to satisfy a threshold, or a CSI report that does not satisfy a threshold or has been transmitted more than a threshold time period previously, or the like) or may select a second transmission mode (e.g., a lower number of repetitions) for higher channel quality measurements (e.g., channel quality measurements that satisfy a threshold). Information regarding which transmission modes correspond to or should be mapped to which conditions may be included in the configuration information (e.g., the criteria) received at 305 in the SIB message, at 310 in the RRC message, or any combination thereof.

In some examples, the conditions may include UE power class. The UE 115-b's power class may inform a maximum transmit power, and, therefore, possible transmit distance. In such examples, the UE 115-b may select a first transmission mode if it corresponds to a first UE power class, a second transmission mode if the UE 115-b corresponds to a second power class, etc.

A third condition may be presence or number of unsuccessful PRACH transmission attempts. For example, if there have been unsuccessful PRACH transmission attempts a greater number of repetitions may be beneficial. Each of the conditions described herein may be examples of possible conditions within the set of different conditions and may not represent all of the possible conditions within the set of different conditions.

In some cases, the criteria for selection of the PRACH transmission method may depend on whether the CFRA RACH is based on SSB, CSI-RS, or a combination thereof. In some cases, the criteria for selection of the PRACH transmission method may depend on the purpose of the beam sweep procedure. For example, a first subset of the criteria (e.g., a set of transmission modes and corresponding conditions in which to select the transmission modes from the set of transmission modes) may correspond to CFRA procedures for beam failure recovery. A second subset of the criteria may correspond to CFRA procedures for handover procedures, a third subset of the criteria may correspond to CFRA procedures for SCG set-up procedures, etc. The UE 115-b may select the transmission mode that corresponds to the identified conditions based on the subset of criteria to which a current random access procedure (e.g., CFRA procedure) corresponds.

In some cases, the PRACH transmission method may include one or more transmission modes of a set of different transmission modes. For example, a first transmission mode may include repetition of PRACH transmissions on multiple ROs. Each RO may be mapped to a specific SSB on a certain beam (e.g., a beam from the base station 105-b). By repeating PRACH transmissions on multiple ROs, and therefore multiple beams, the UE 115-b may enhance coverage. A second transmission mode may be repetition of PRACH transmissions on multiple CCs and/or multiple frequency allocations associated to the same CCs. For example, through carrier aggregation. By repeating PRACH transmissions according to the second transmission mode, network efficiency may improve (e.g., increased bandwidth, data rates, throughput, etc.). The second transmission mode may be applicable depending on the multiple CCs being in the same frequency band. A third transmission mode may include using superposition of two or more PRACH preambles. Superposition may conserve resources and reduce transmission overhead. A fourth transmission mode may include using different RACH resources (e.g., different PRACH preambles). A fifth transmission mode may include using different PRACH formats. The first, second, third, fourth, and fifth transmission mode may be examples of possible transmission mode within the set of different options and may not represent all of the possible transmission mode within the set of different options. For example, transmission modes may include a number of repetitions, a pattern of repetitions, resources for transmitting the repetitions, or the like.

The UE 115-b may select the transmission mode based on one condition, or multiple conditions. For example, different combinations of conditions (e.g., power class, carrier aggregation configuration, channel quality measurements, etc.) may result in selection of different transmission modes.

At 320, the UE 115-b may transmit PRACH repetitions (e.g., repetitions of a Msg1) according to the selected method of transmission. In some cases, the UE 115-b may repeatedly send, to the base station 105-b, repetitions of the Msg1 a set number of times, according to the configuration information, the selected transmission mode, or the like. The PRACH repetitions may be a respective example of PRACH repetitions 225 as described with reference to FIG. 2.

Figure 4:
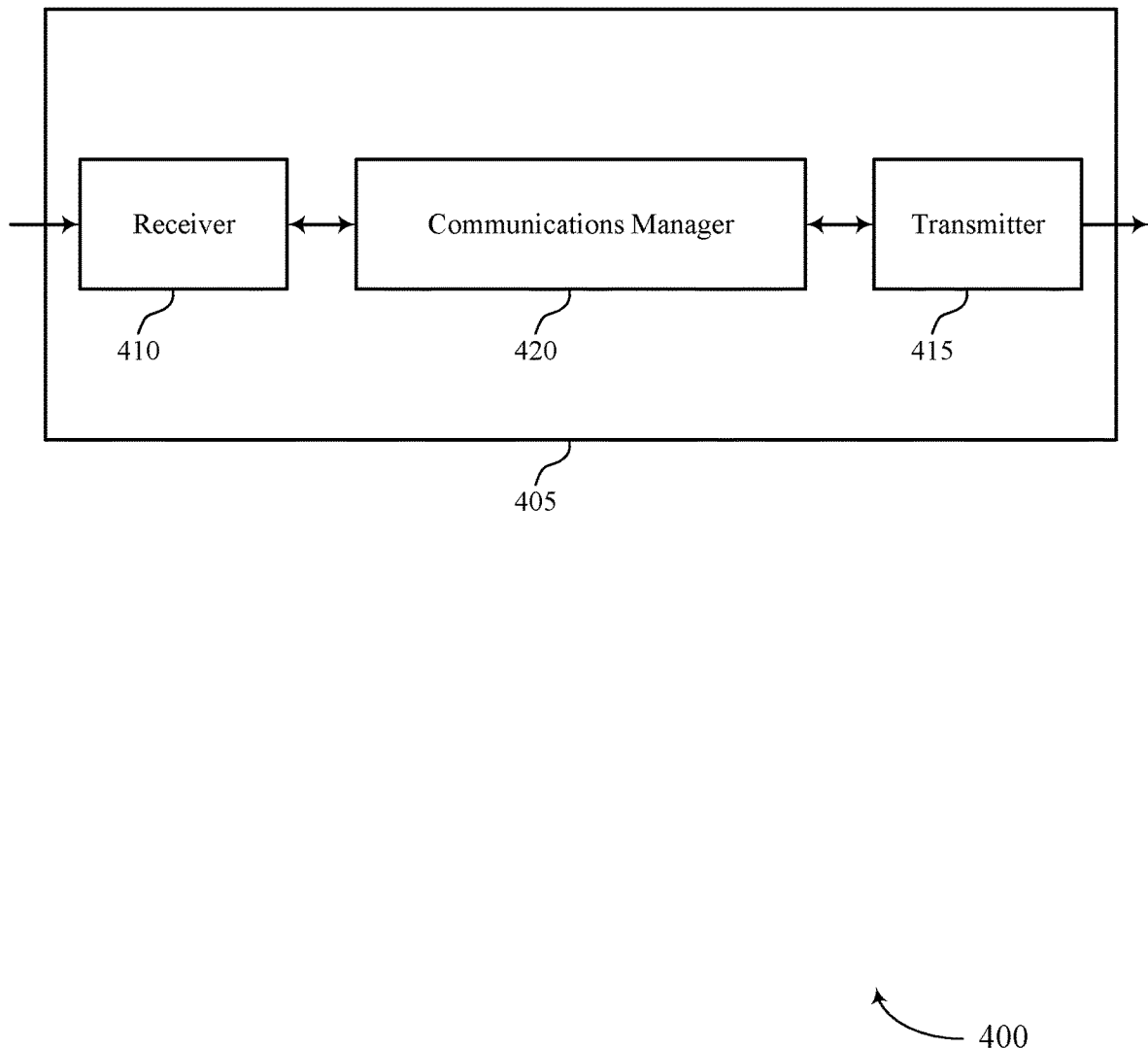
FIGS. 4 and 5 show block diagrams of devices that support techniques for contention-free random access transmission method selection in accordance with aspects of the present disclosure.

FIG. 4 shows a block diagram 400 of a device 405 that supports techniques for contention-free random access transmission method selection in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for contention-free random access transmission method selection). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for contention-free random access transmission method selection). In some examples, the transmitter 415 may be co-located with a receiver 410 in a transceiver unit. The transmitter 415 may utilize a single antenna or a set of multiple antennas.

The communications manager 420, the receiver 410, the transmitter 415, or various combinations thereof or various components thereof may be examples of means for performing various aspects of techniques for contention-free random access transmission method selection as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, control signaling including an indication of criteria for selection of a transmission mode from a set of transmission modes for transmission of a random access request message while the UE is in a connected mode with the base station. The communications manager 420 may be configured as or otherwise support a means for selecting the transmission mode from the set of transmission modes based on one or more conditions satisfying the criteria. The communications manager 420 may be configured as or otherwise support a means for transmitting, according to the transmission mode and while the UE is in the connected mode with the base station, a set of repetitions of the random access request message.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for selection of a transmission mode for transmission of a random access request message. Described techniques may result in increased probability of the base station 105 receiving the PRACH transmissions despite the interference, failed reception, or other issues. Described techniques may benefit the system by reducing a number of failed RA procedures, improving communications reliability, supporting more efficient utilization of communication resources, etc.

Figure 5:
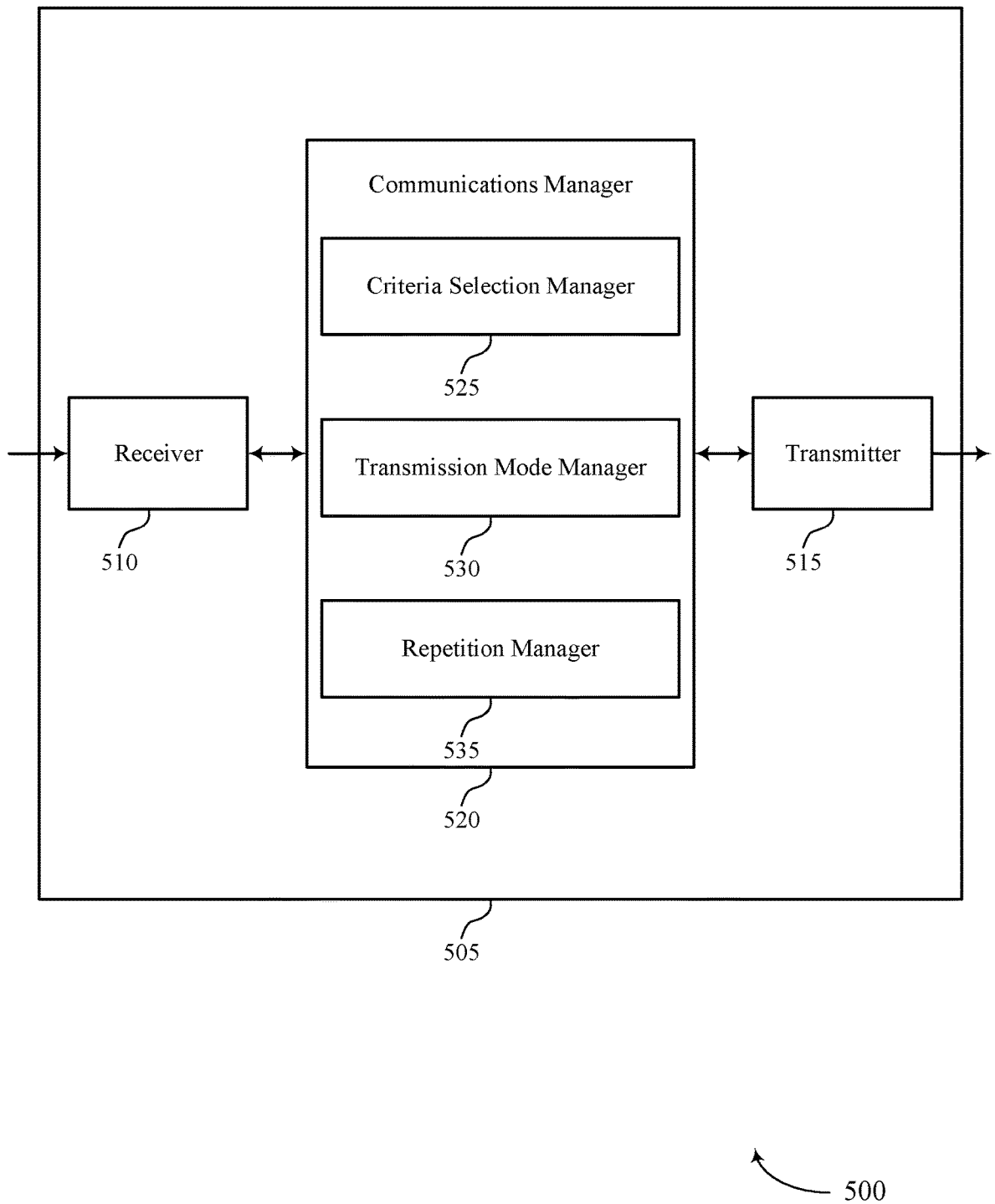

FIG. 5 shows a block diagram 500 of a device 505 that supports techniques for contention-free random access transmission method selection in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for contention-free random access transmission method selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for contention-free random access transmission method selection). In some examples, the transmitter 515 may be co-located with a receiver 510 in a transceiver unit. The transmitter 515 may utilize a single antenna or a set of multiple antennas.

The device 505, or various components thereof, may be an example of means for performing various aspects of techniques for contention-free random access transmission method selection as described herein. For example, the communications manager 520 may include a criteria selection manager 525, a transmission mode manager 530, a repetition manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The criteria selection manager 525 may be configured as or otherwise support a means for receiving, from a base station, control signaling including an indication of criteria for selection of a transmission mode from a set of transmission modes for transmission of a random access request message while the UE is in a connected mode with the base station. The transmission mode manager 530 may be configured as or otherwise support a means for selecting the transmission mode from the set of transmission modes based on one or more conditions satisfying the criteria. The repetition manager 535 may be configured as or otherwise support a means for transmitting, according to the transmission mode and while the UE is in the connected mode with the base station, a set of repetitions of the random access request message.

Figure 6:
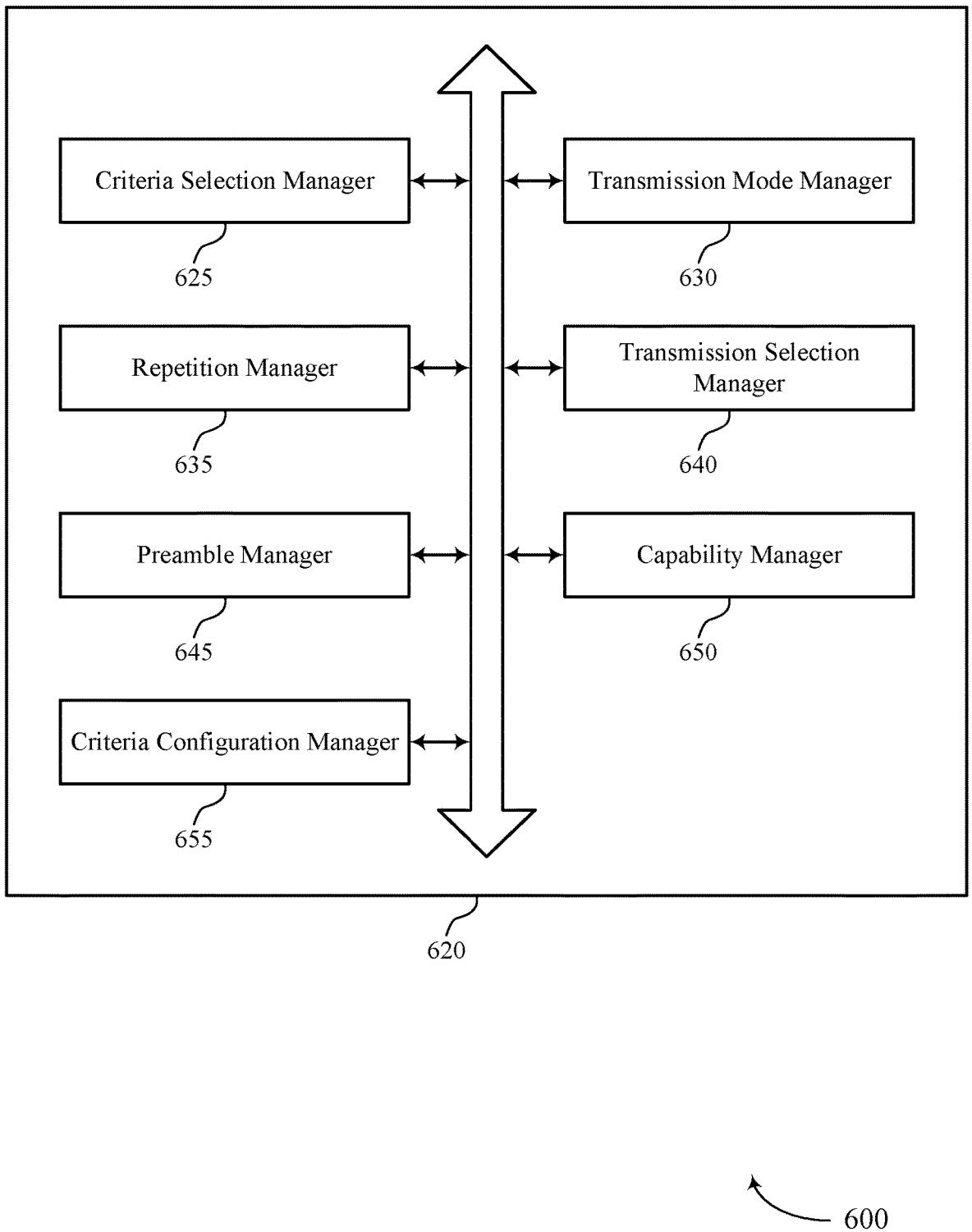
FIG. 6 shows a block diagram of a communications manager that supports techniques for contention-free random access transmission method selection in accordance with aspects of the present disclosure.

FIG. 6 shows a block diagram 600 of a communications manager 620 that supports techniques for contention-free random access transmission method selection in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for contention-free random access transmission method selection as described herein. For example, the communications manager 620 may include a criteria selection manager 625, a transmission mode manager 630, a repetition manager 635, a transmission selection manager 640, a preamble manager 645, a capability manager 650, a criteria configuration manager 655, or any combination thereof. Each of these components may communicate, directly or indirectly, with one another (e.g., via one or more buses).

The communications manager 620 may support wireless communications at a UE in accordance with examples as disclosed herein. The criteria selection manager 625 may be configured as or otherwise support a means for receiving, from a base station, control signaling including an indication of criteria for selection of a access request message while the UE is in a connected mode with the base station. The transmission mode manager 630 may be configured as or otherwise support a means for selecting the transmission mode from the set of transmission modes based on one or more conditions satisfying the criteria. The repetition manager 635 may be configured as or otherwise support a means for transmitting, according to the transmission mode and while the UE is in the connected mode with the base station, a set of repetitions of the random access request message.

In some examples, to support selecting the transmission mode from the set of transmission modes, the transmission selection manager 640 may be configured as or otherwise support a means for selecting from the set of transmission modes that includes transmission of the set of repetitions of the random access request message across multiple random access occasions, transmission of the set of repetitions of the random access request message on multiple component carriers, transmission of the set of repetitions of the random access request message on multiple frequency allocations associated with a same component carrier, or any combination thereof.

In some examples, to support selecting the transmission mode from the set of transmission modes, the transmission selection manager 640 may be configured as or otherwise support a means for selecting from the set of transmission modes that includes transmission of the set of repetitions of the random access request message according to a random access format of a set of random access formats, transmission of the set of repetitions of the random access request message using a random access resource of a set of random access resources, or any combination thereof.

In some examples, the preamble manager 645 may be configured as or otherwise support a means for receiving, from the base station, an indication of a preamble that is allocated to the UE for a contention-free random access procedure, where the random access request message includes the preamble.

In some examples, to support selecting the transmission mode from the set of transmission modes, the transmission selection manager 640 may be configured as or otherwise support a means for selecting from the set of transmission modes that includes transmission of the set of repetitions of the random access request message including the preamble and transmission of the set of repetitions of the random access request message including the preamble superimposed with a second preamble.

In some examples, the capability manager 650 may be configured as or otherwise support a means for transmitting, to the base station, capability information including an indication that the UE supports selection of the transmission mode, where receiving the control signaling including the indication of criteria for selection of the transmission mode is based on transmitting the capability information.

In some examples, to support receiving the control signaling, the criteria selection manager 625 may be configured as or otherwise support a means for receiving a radio resource control message including the indication of the criteria for selection of the transmission mode from the set of transmission modes.

In some examples, the criteria configuration manager 655 may be configured as or otherwise support a means for receiving system information including an initial set of values for the criteria for selection of the transmission mode from the set of transmission modes. In some examples, to support receiving the control signaling, the criteria configuration manager 655 may be configured as or otherwise support a means for receiving a radio resource control message including one or more offsets to the initial set of values for the criteria for selection of the transmission mode from the set of transmission modes.

In some examples, the criteria selection manager 625 may be configured as or otherwise support a means for identifying, based on receiving the control signaling, a first subset of the criteria associated with a first type of random access procedure. In some examples, the criteria selection manager 625 may be configured as or otherwise support a means for selecting the first subset of the criteria from the criteria based on a contention-free random access procedure being the first type of random access procedure, where selecting the transmission mode from the set of transmission modes is based on the one or more conditions satisfying the first subset of the criteria.

In some examples, the first type of random access procedure includes random access based on receiving one or more synchronization signal blocks or based on receiving one or more channel state information reference signals. In some examples, the first type of random access procedure is a beam failure recovery procedure, a handover procedure, or a secondary cell group set up procedure.

In some examples, to support receiving the control signaling including the indication of criteria for selection of the transmission mode, the criteria selection manager 625 may be configured as or otherwise support a means for receiving, as the criteria, a threshold measurement value for synchronization signal blocks, a power class of the UE, a number of previous unsuccessful random access transmission attempts, a CSI measurement report, or any combination thereof.

Figure 7:
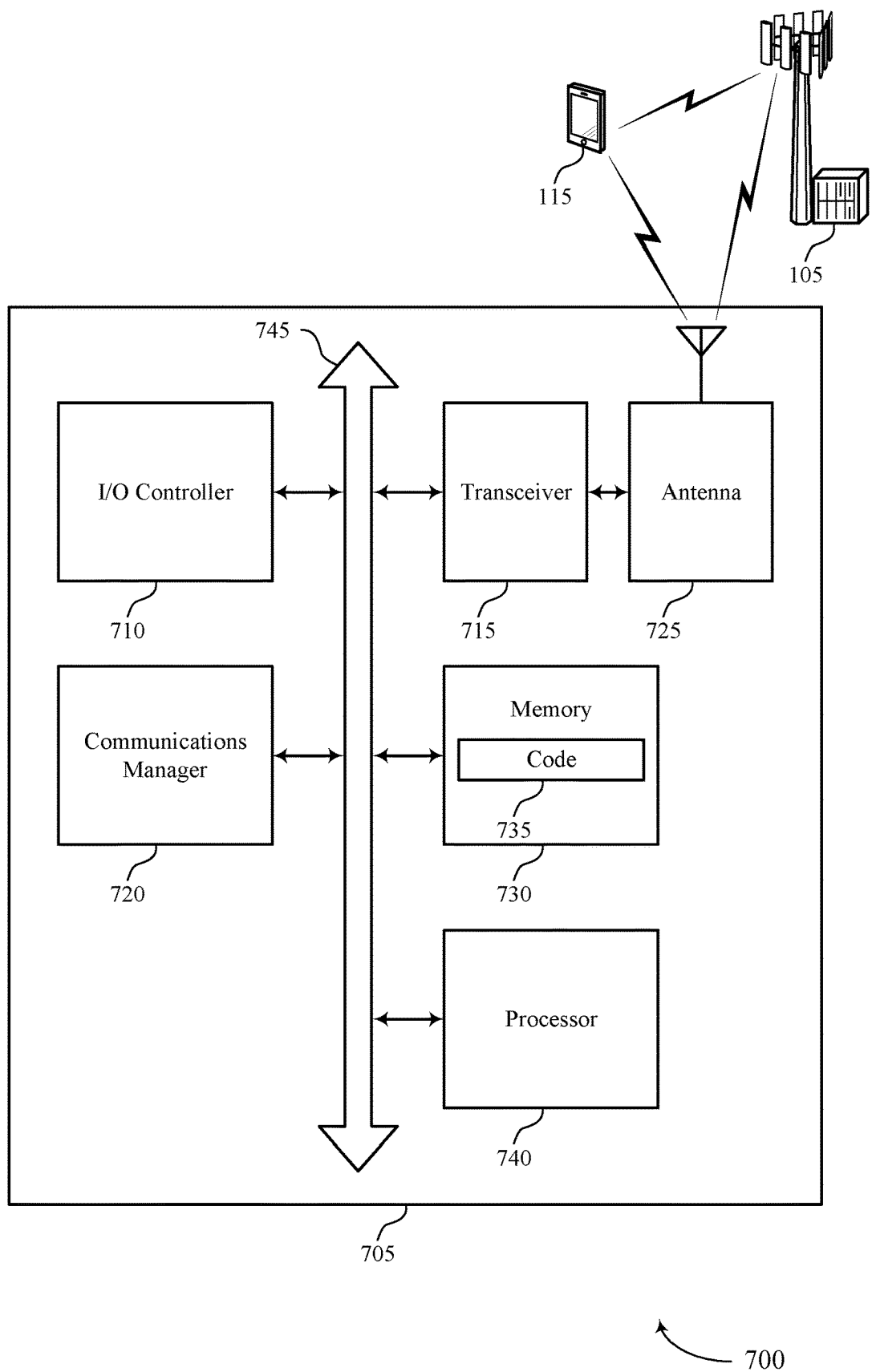
FIG. 7 shows a diagram of a system including a device that supports techniques for contention-free random access transmission method selection in accordance with aspects of the present disclosure.

FIG. 7 shows a diagram of a system 700 including a device 705 that supports techniques for contention-free random access transmission method selection in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for contention-free random access transmission method selection). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, control signaling including an indication of criteria for selection of a transmission mode from a set of transmission modes for transmission of a random access request message while the UE is in a connected mode with the base station. The communications manager 720 may be configured as or otherwise support a means for selecting the transmission mode from the set of transmission modes based on one or more conditions satisfying the criteria. The communications manager 720 may be configured as or otherwise support a means for transmitting, according to the transmission mode and while the UE is in the connected mode with the base station, a set of repetitions of the random access request message.

By including or configuring the communications manager 720 in accordance with examples as described herein, the device 705 may support techniques for selection of a transmission mode for transmission of a random access request message. These techniques may enable a UE 115 to more reliably communicate with a base station 105, through a beam sweep procedure, after already being in a connected mode. A UE 115 may use these techniques to send repetitions of PRACH transmissions for efficient coverage enhancement. Described techniques may result in increased probability of the base station 105 receiving the PRACH transmissions despite the interference, failed reception of one transmission, or other issues. Described techniques may benefit the system by reducing a number of failed RA procedures, improving communications reliability, supporting more efficient utilization of communication resources, reducing power consumption, reducing latency, improving user experience related to reduced processing, etc.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for contention-free random access transmission method selection as described herein, or the processor 740 and the memory 730 may be otherwise configured to perform or support such operations.

Figure 8:
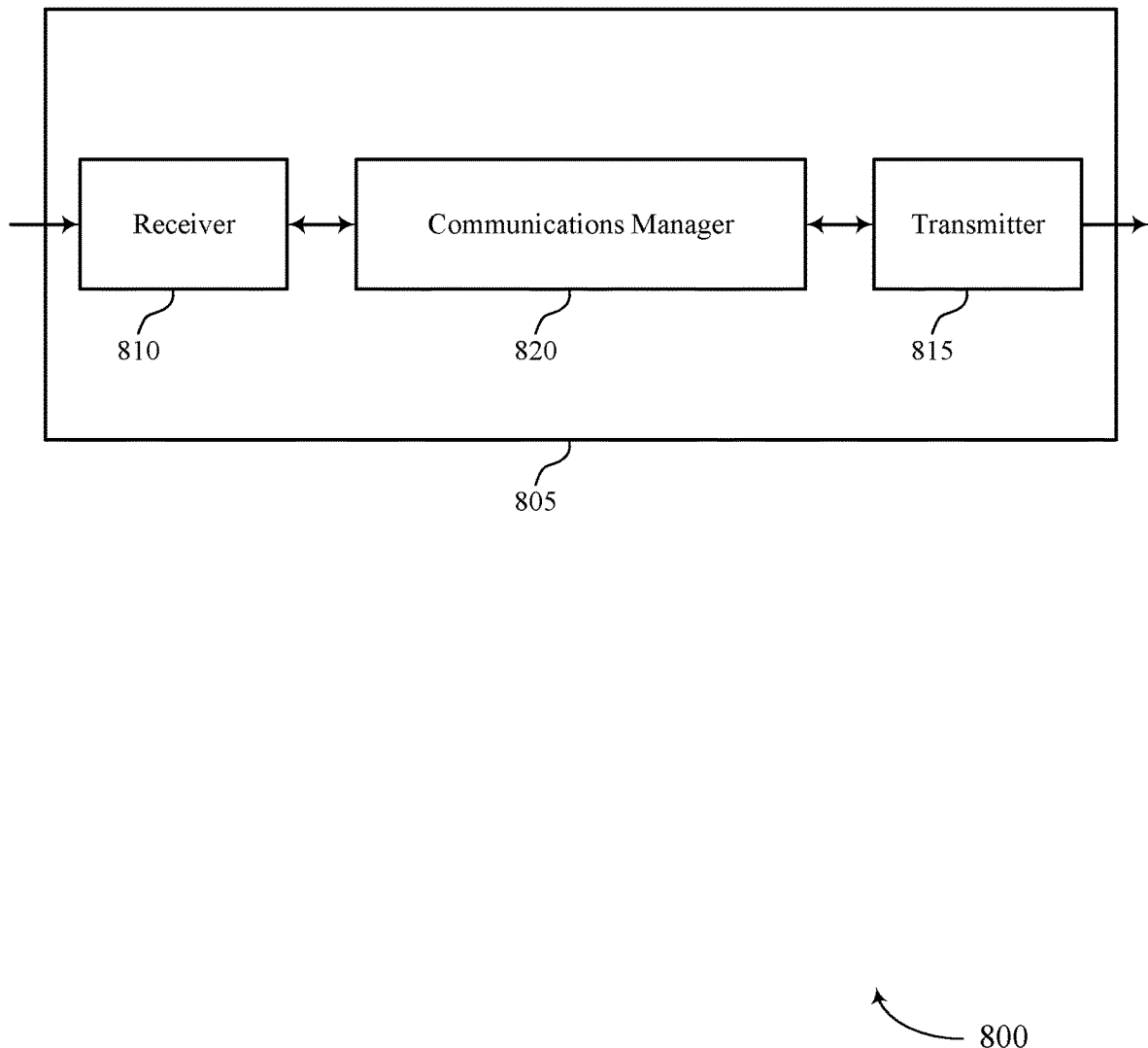
FIGS. 8 and 9 show block diagrams of devices that support techniques for contention-free random access transmission method selection in accordance with aspects of the present disclosure.

FIG. 8 shows a block diagram 800 of a device 805 that supports techniques for contention-free random access transmission method selection in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for contention-free random access transmission method selection). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for contention-free random access transmission method selection). In some examples, the transmitter 815 may be co-located with a receiver 810 in a transceiver unit. The transmitter 815 may utilize a single antenna or a set of multiple antennas.

The communications manager 820, the receiver 810, the transmitter 815, or various combinations thereof or various components thereof may be examples of means for performing various aspects of techniques for contention-free random access transmission method selection as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, control signaling including an indication of criteria for selection of a transmission mode from a set of transmission modes for transmission of a random access request message while the UE is in a connected mode with the base station. The communications manager 820 may be configured as or otherwise support a means for monitoring for a set of repetitions of the random access request message based on one or more conditions satisfying the criteria. The communications manager 820 may be configured as or otherwise support a means for receiving, from the UE based on the monitoring, the set of repetitions of the random access request message in accordance with the transmission mode.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for selection of a transmission mode for transmission of a random access request message. Described techniques may result in increased probability of the base station 105 receiving the PRACH transmissions despite interference, failed reception of one transmission, or other issues. Described techniques may benefit the system by reducing a number of failed RA procedures, improving communications reliability, supporting more efficient utilization of communication resources, etc.

Figure 9:
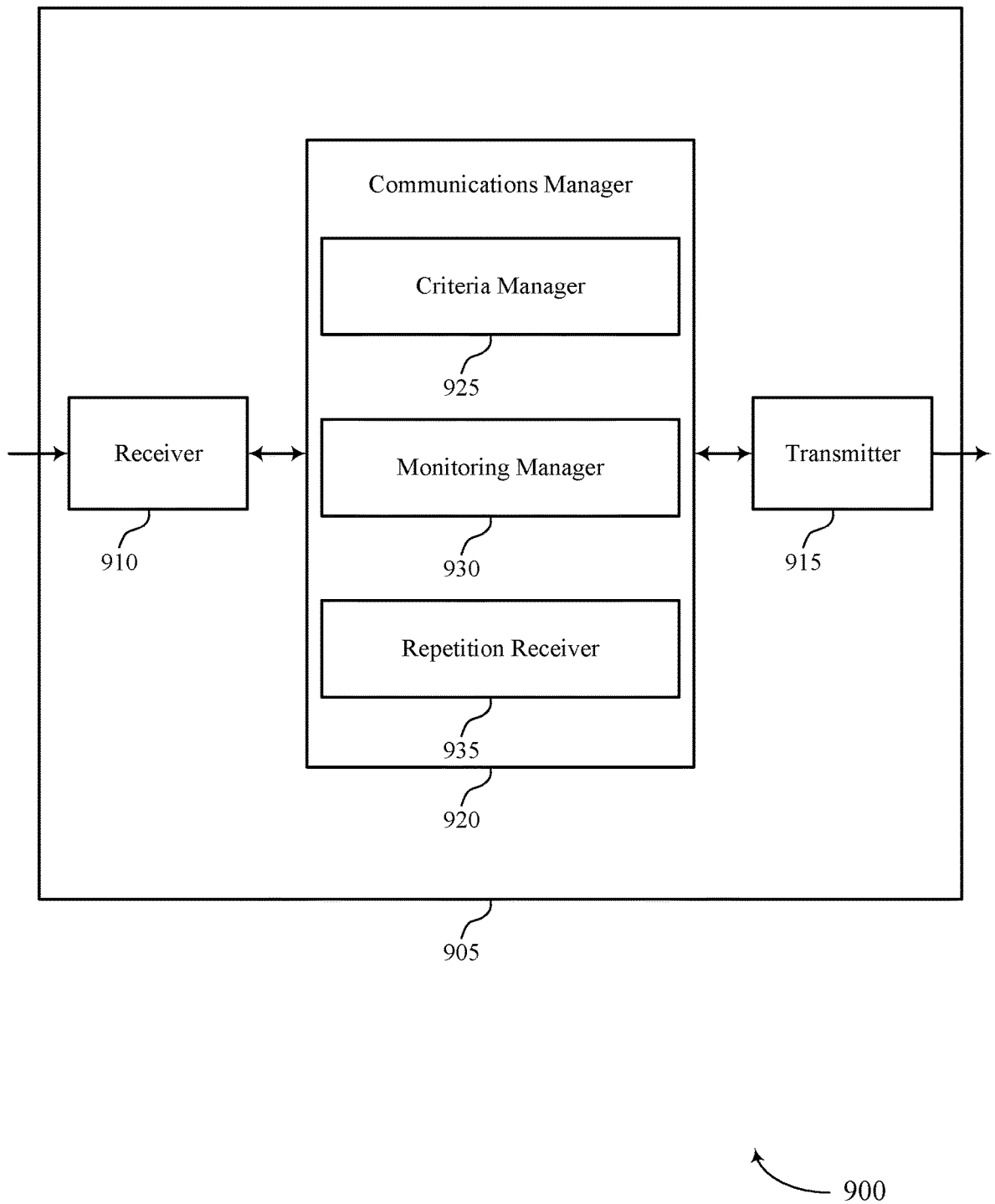

FIG. 9 shows a block diagram 900 of a device 905 that supports techniques for contention-free random access transmission method selection in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for contention-free random access transmission method selection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for contention-free random access transmission method selection). In some examples, the transmitter 915 may be co-located with a receiver 910 in a transceiver unit. The transmitter 915 may utilize a single antenna or a set of multiple antennas.

The device 905, or various components thereof, may be an example of means for performing various aspects of techniques for contention-free random access transmission method selection as described herein. For example, the communications manager 920 may include a criteria manager 925, a monitoring manager 930, a repetition receiver 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The criteria manager 925 may be configured as or otherwise support a means for transmitting, to a UE, control signaling including an indication of criteria for selection of a transmission mode from a set of transmission modes for transmission of a random access request message while the UE is in a connected mode with the base station. The monitoring manager 930 may be configured as or otherwise support a means for monitoring for a set of repetitions of the random access request message based on one or more conditions satisfying the criteria. The repetition receiver 935 may be configured as or otherwise support a means for receiving, from the UE based on the monitoring, the set of repetitions of the random access request message in accordance with the transmission mode.

Figure 10:
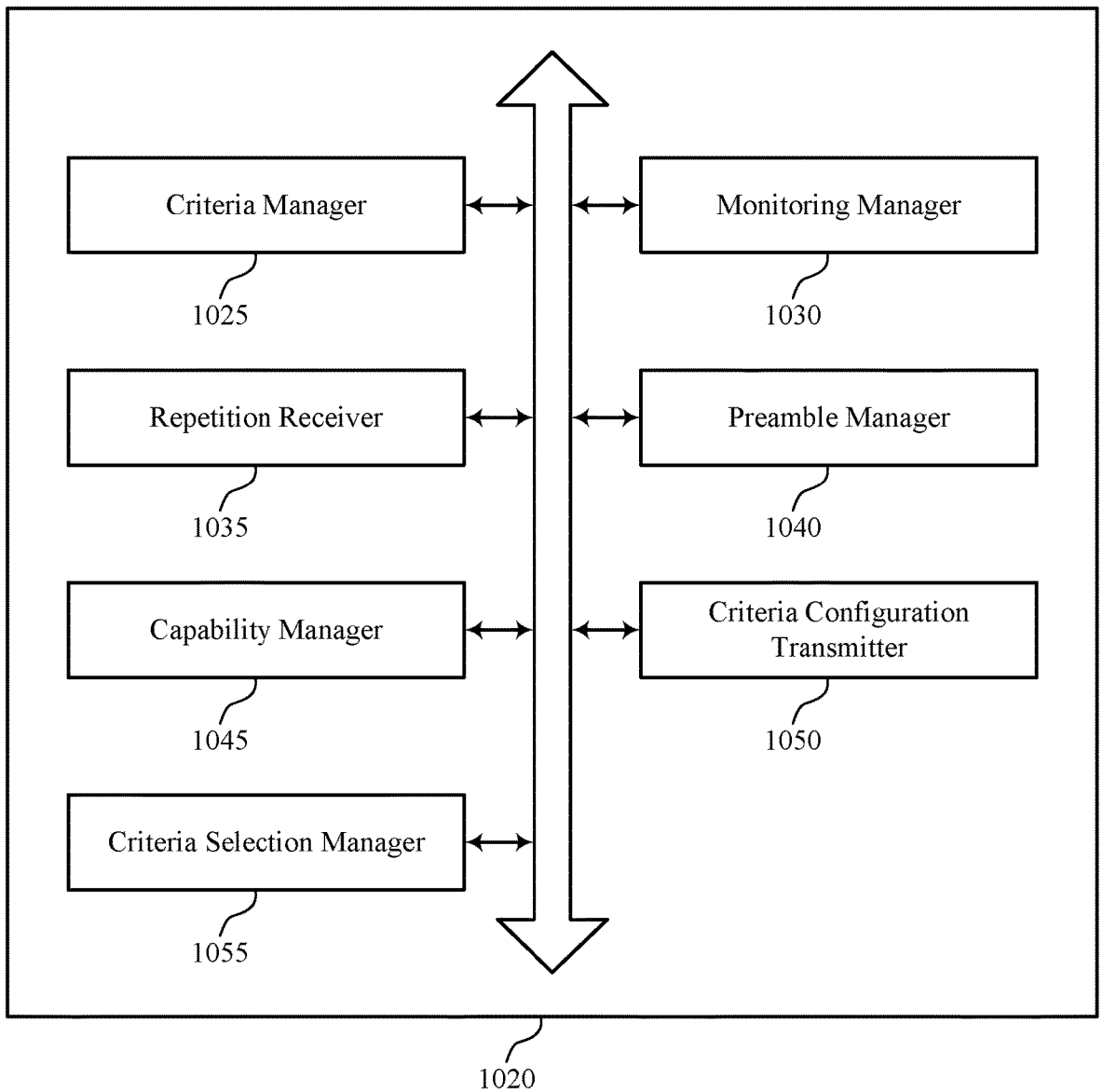
FIG. 10 shows a block diagram of a communications manager that supports techniques for contention-free random access transmission method selection in accordance with aspects of the present disclosure.

FIG. 10 shows a block diagram 1000 of a communications manager 1020 that supports techniques for contention-free random access transmission method selection in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for contention-free random access transmission method selection as described herein. For example, the communications manager 1020 may include a criteria manager 1025, a monitoring manager 1030, a repetition receiver 1035, a preamble manager 1040, a capability manager 1045, a criteria configuration transmitter 1050, a criteria selection manager 1055, or any combination thereof. Each of these components may communicate, directly or indirectly, with one another (e.g., via one or more buses).

The communications manager 1020 may support wireless communications at a base station in accordance with examples as disclosed herein. The criteria manager 1025 may be configured as or otherwise support a means for transmitting, to a UE, control signaling including an indication of criteria for selection of a transmission mode from a set of transmission modes for transmission of a random access request message while the UE is in a connected mode with the base station. The monitoring manager 1030 may be configured as or otherwise support a means for monitoring for a set of repetitions of the random access request message based on one or more conditions satisfying the criteria. The repetition receiver 1035 may be configured as or otherwise support a means for receiving, from the UE based on the monitoring, the set of repetitions of the random access request message in accordance with the transmission mode.

In some examples, to support receiving the set of repetitions of the random access request message in accordance with the transmission mode, the repetition receiver 1035 may be configured as or otherwise support a means for receiving the set of repetitions in accordance with one of the set of transmission modes which includes transmission of the set of repetitions of the random access request message across multiple random access occasions, transmission of the set of repetitions of the random access request message on multiple component carriers, transmission of the set of repetitions of the random access request message on multiple frequency allocations associated with a same component carrier, or any combination thereof.

In some examples, to support receiving the set of repetitions of the random access request message in accordance with the transmission mode, the repetition receiver 1035 may be configured as or otherwise support a means for receiving the set of repetitions in accordance with one of the set of transmission modes which includes transmission of the set of repetitions of the random access request message according to a random access format of a set of random access formats, transmission of the set of repetitions of the random access request message using a random access resource of a set of random access resources, or any combination thereof.

In some examples, the preamble manager 1040 may be configured as or otherwise support a means for transmitting, to the UE, an indication of a preamble that is allocated to the UE for a contention-free random access procedure, where the random access request message includes the preamble.

In some examples, to support receiving the set of repetitions of the random access request message in accordance with the transmission mode, the repetition receiver 1035 may be configured as or otherwise support a means for receiving the set of repetitions in accordance with one of the set of transmission modes which includes transmission of the set of repetitions of the random access request message including the preamble and transmission of the set of repetitions of the random access request message including the preamble superimposed with a second preamble.

In some examples, the capability manager 1045 may be configured as or otherwise support a means for receiving, from the UE, capability information including an indication that the UE supports selection of the transmission mode, where transmitting the control signaling including the indication of criteria for selection of the transmission mode is based on receiving the capability information.

In some examples, to support transmitting the control signaling, the criteria manager 1025 may be configured as or otherwise support a means for transmitting a radio resource control message including the indication of the criteria for selection of the transmission mode from the set of transmission modes.

In some examples, the criteria configuration transmitter 1050 may be configured as or otherwise support a means for transmitting system information including an initial set of values for the criteria for selection of the transmission mode from the set of transmission modes.

In some examples, to support transmitting the control signaling, the criteria configuration transmitter 1050 may be configured as or otherwise support a means for transmitting a radio resource control message including one or more offsets to the initial set of values for the criteria for selection of the transmission mode from the set of transmission modes.

In some examples, the criteria selection manager 1055 may be configured as or otherwise support a means for identifying, based on transmitting the control signaling, a first subset of the criteria associated with a first type of random access procedure. In some examples, the criteria selection manager 1055 may be configured as or otherwise support a means for selecting the first subset of the criteria from the criteria based on a contention-free random access procedure being the first type of random access procedure, where monitoring for the set of repetitions of the random access request message is based on the one or more conditions satisfying the first subset of the criteria.

In some examples, the first type of random access procedure includes random access based on receiving one or more synchronization signal blocks or based on receiving one or more channel state information reference signals.

In some examples, the first type of random access procedure is a beam failure recovery procedure, a handover procedure, or a secondary cell group set up procedure.

Figure 11:
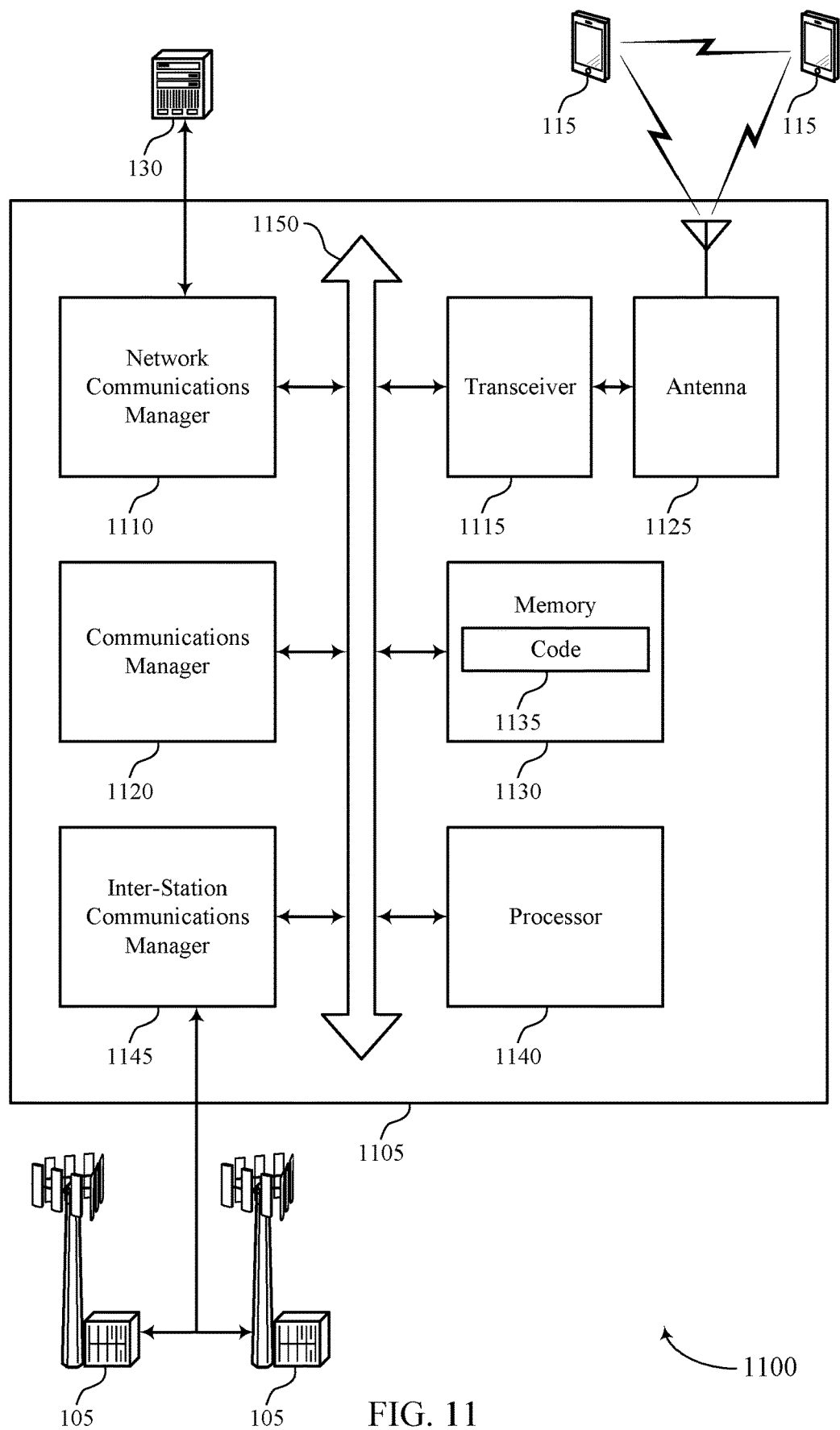
FIG. 11 shows a diagram of a system including a device that supports techniques for contention-free random access transmission method selection in accordance with aspects of the present disclosure.

FIG. 11 shows a diagram of a system 1100 including a device 1105 that supports techniques for contention-free random access transmission method selection in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for contention-free random access transmission method selection). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, control signaling including an indication of criteria for selection of a transmission mode from a set of transmission modes for transmission of a random access request message while the UE is in a connected mode with the base station. The communications manager 1120 may be configured as or otherwise support a means for monitoring for a set of repetitions of the random access request message based on one or more conditions satisfying the criteria. The communications manager 1120 may be configured as or otherwise support a means for receiving, from the UE based on the monitoring, the set of repetitions of the random access request message in accordance with the transmission mode.

By including or configuring the communications manager 1120 in accordance with examples as described herein, the device 1105 may support techniques for selection of a transmission mode for transmission of a random access request message. These techniques may enable a UE 115 to more reliably communicate with a base station 105, through a beam sweep procedure, after already being in a connected mode. A UE 115 may use these techniques to send repetitions of PRACH transmissions for efficient coverage enhancement. Described techniques may benefit the system by reducing a number of failed RA procedures, improving communications reliability, supporting more efficient utilization of communication resources, reducing power consumption, reducing latency, improving user experience related to reduced processing, etc.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for contention-free random access transmission method selection as described herein, or the processor 1140 and the memory 1130 may be otherwise configured to perform or support such operations.

Figure 12:
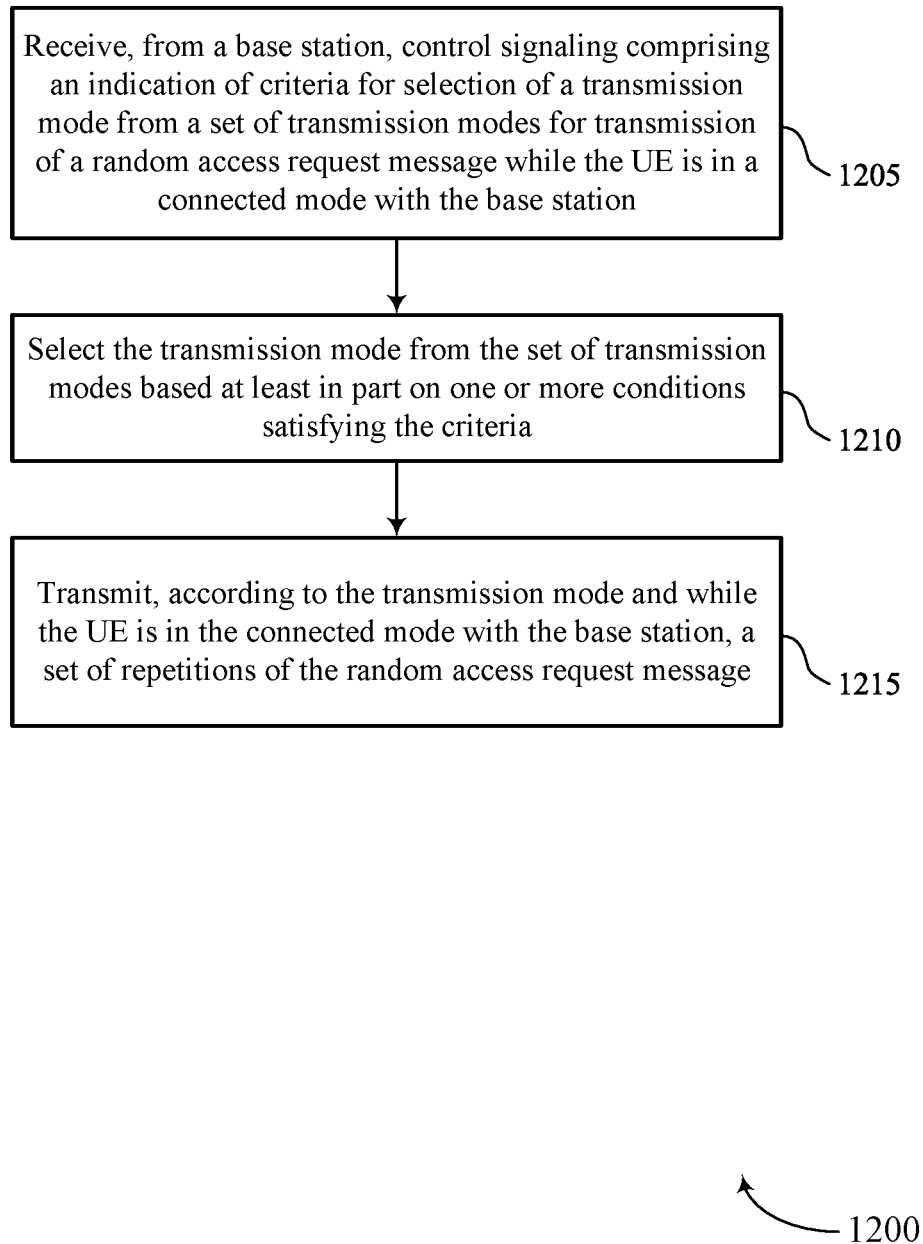
FIGS. 12 through 15 show flowcharts illustrating methods that support techniques for contention-free random access transmission method selection in accordance with aspects of the present disclosure.

FIG. 12 shows a flowchart illustrating a method 1200 that supports techniques for contention-free random access transmission method selection in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a base station, control signaling including an indication of criteria for selection of a transmission mode from a set of transmission modes for transmission of a random access request message while the UE is in a connected mode with the base station. The operations of 1205 may be performed in accordance with examples as disclosed herein. In some examples, aspects of the operations of 1205 may be performed by a criteria selection manager 625 as described with reference to FIG. 6.

At 1210, the method may include selecting the transmission mode from the set of transmission modes based on one or more conditions satisfying the criteria. The operations of 1210 may be performed in accordance with examples as disclosed herein. In some examples, aspects of the operations of 1210 may be performed by a transmission mode manager 630 as described with reference to FIG. 6.

At 1215, the method may include transmitting, according to the transmission mode and while the UE is in the connected mode with the base station, a set of repetitions of the random access request message. The operations of 1215 may be performed in accordance with examples as disclosed herein. In some examples, aspects of the operations of 1215 may be performed by a repetition manager 635 as described with reference to FIG. 6.

Figure 13:
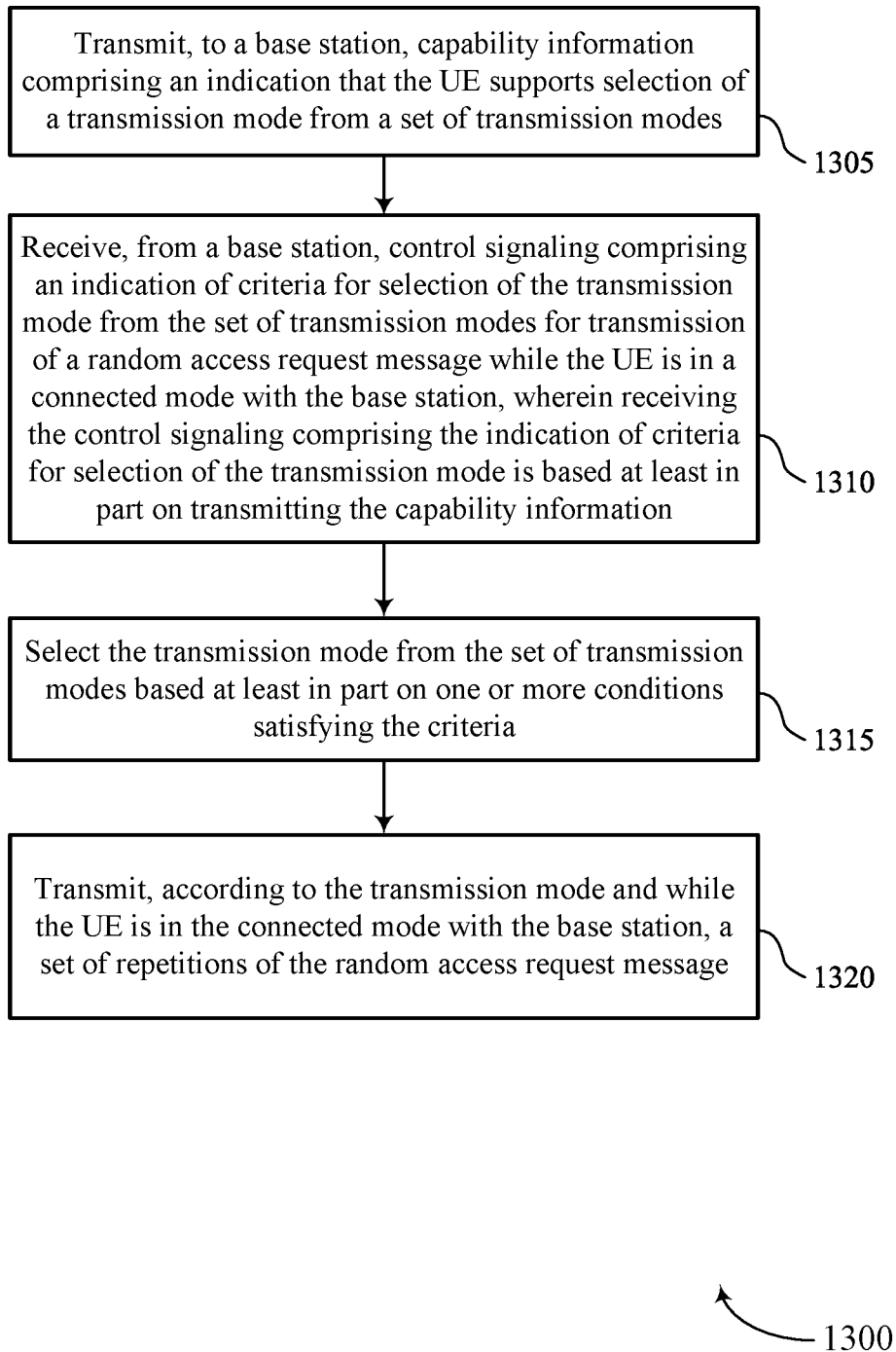

FIG. 13 shows a flowchart illustrating a method 1300 that supports techniques for contention-free random access transmission method selection in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, to a base station, capability information including an indication that the UE supports selection of a transmission mode from a set of transmission modes. The operations of 1305 may be performed in accordance with examples as disclosed herein. In some examples, aspects of the operations of 1305 may be performed by a capability manager 650 as described with reference to FIG. 6.

At 1310, the method may include receiving, from a base station, control signaling including an indication of criteria for selection of the transmission mode from the set of transmission modes for transmission of a random access request message while the UE is in a connected mode with the base station, where receiving the control signaling including the indication of criteria for selection of the transmission mode is based on transmitting the capability information. The operations of 1310 may be performed in accordance with examples as disclosed herein. In some examples, aspects of the operations of 1310 may be performed by a criteria selection manager 625 as described with reference to FIG. 6.

At 1315, the method may include selecting the transmission mode from the set of transmission modes based on one or more conditions satisfying the criteria. The operations of 1315 may be performed in accordance with examples as disclosed herein. In some examples, aspects of the operations of 1315 may be performed by a transmission mode manager 630 as described with reference to FIG. 6.

At 1320, the method may include transmitting, according to the transmission mode and while the UE is in the connected mode with the base station, a set of repetitions of the random access request message. The operations of 1320 may be performed in accordance with examples as disclosed herein. In some examples, aspects of the operations of 1320 may be performed by a repetition manager 635 as described with reference to FIG. 6.

Figure 14:
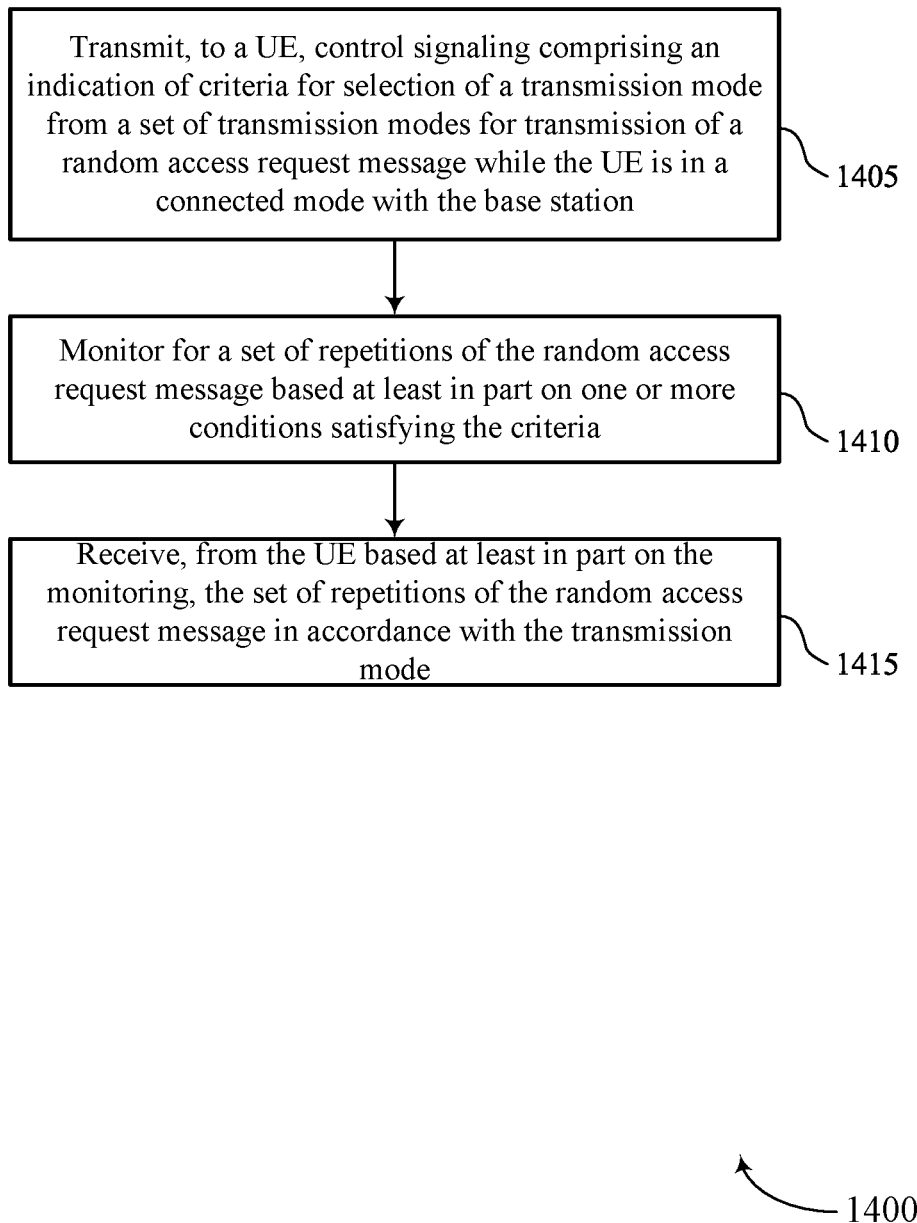

FIG. 14 shows a flowchart illustrating a method 1400 that supports techniques for contention-free random access transmission method selection in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1405, the method may include transmitting, to a UE, control signaling including an indication of criteria for selection of a transmission mode from a set of transmission modes for transmission of a random access request message while the UE is in a connected mode with the base station. The operations of 1405 may be performed in accordance with examples as disclosed herein. In some examples, aspects of the operations of 1405 may be performed by a criteria manager 1025 as described with reference to FIG. 10.

At 1410, the method may include monitoring for a set of repetitions of the random access request message based on one or more conditions satisfying the criteria. The operations of 1410 may be performed in accordance with examples as disclosed herein. In some examples, aspects of the operations of 1410 may be performed by a monitoring manager 1030 as described with reference to FIG. 10.

At 1415, the method may include receiving, from the UE based on the monitoring, the set of repetitions of the random access request message in accordance with the transmission mode. The operations of 1415 may be performed in accordance with examples as disclosed herein. In some examples, aspects of the operations of 1415 may be performed by a repetition receiver 1035 as described with reference to FIG. 10.

Figure 15:
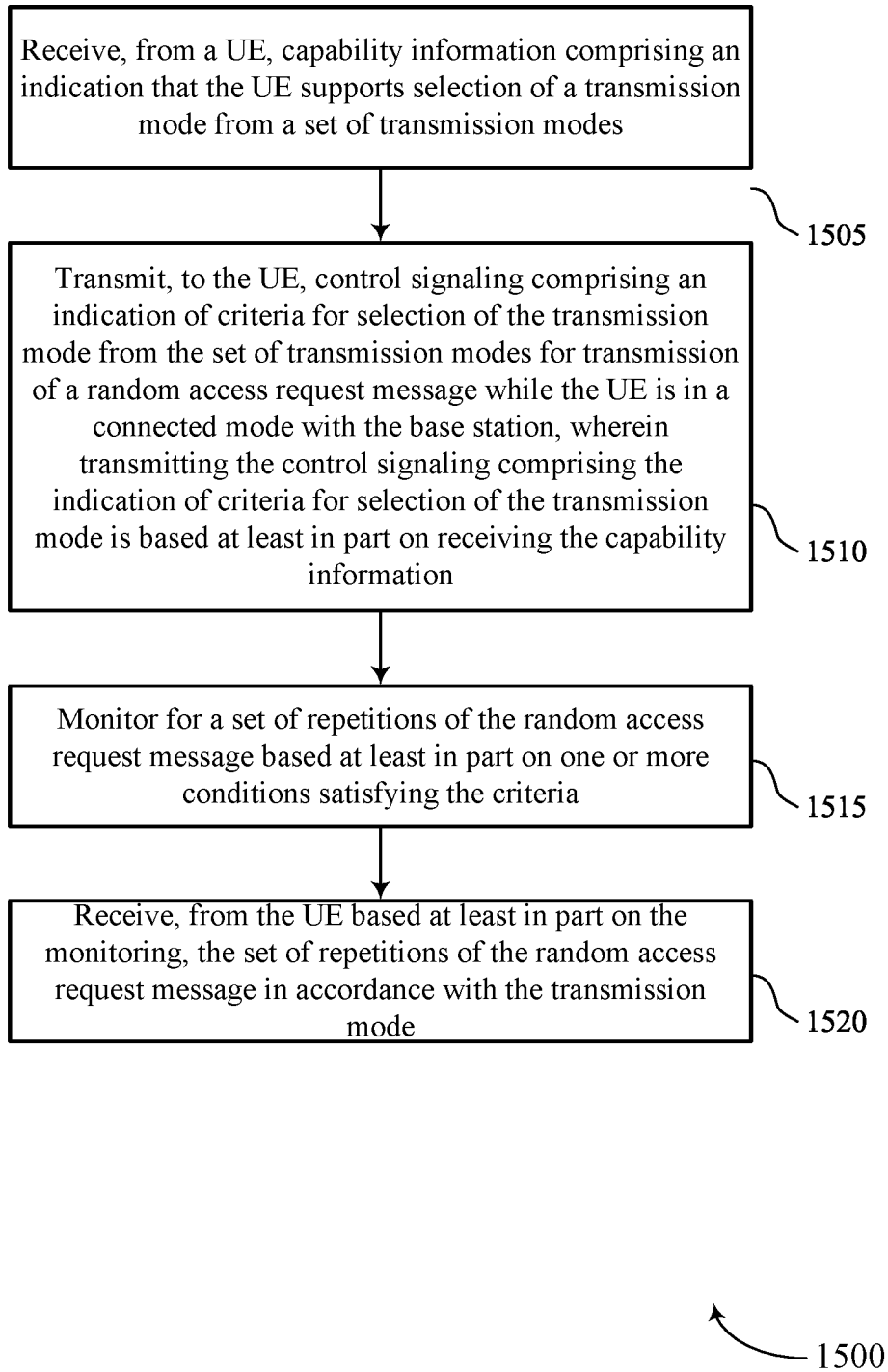

FIG. 15 shows a flowchart illustrating a method 1500 that supports techniques for contention-free random access transmission method selection in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1505, the method may include receiving, from a UE, capability information including an indication that the UE supports selection of a transmission mode from a set of transmission modes. The operations of 1505 may be performed in accordance with examples as disclosed herein. In some examples, aspects of the operations of 1505 may be performed by a capability manager 1045 as described with reference to FIG. 10.

At 1510, the method may include transmitting, to the UE, control signaling including an indication of criteria for selection of the transmission mode from the set of transmission modes for transmission of a random access request message while the UE is in a connected mode with the base station, where transmitting the control signaling including the indication of criteria for selection of the transmission mode is based on receiving the capability information. The operations of 1510 may be performed in accordance with examples as disclosed herein. In some examples, aspects of the operations of 1510 may be performed by a criteria manager 1025 as described with reference to FIG. 10.

At 1515, the method may include monitoring for a set of repetitions of the random access request message based on one or more conditions satisfying the criteria. The operations of 1515 may be performed in accordance with examples as disclosed herein. In some examples, aspects of the operations of 1515 may be performed by a monitoring manager 1030 as described with reference to FIG. 10.

At 1520, the method may include receiving, from the UE based on the monitoring, the set of repetitions of the random access request message in accordance with the transmission mode. The operations of 1520 may be performed in accordance with examples as disclosed herein. In some examples, aspects of the operations of 1520 may be performed by a repetition receiver 1035 as described with reference to FIG. 10.

The following provides an overview of aspects of the present disclosure:

Aspect 1: A method for wireless communications at a UE, comprising: receiving, from a base station, control signaling comprising an indication of criteria for selection of a transmission mode from a set of transmission modes for transmission of a random access request message while the UE is in a connected mode with the base station; selecting the transmission mode from the set of transmission modes based at least in part on one or more conditions satisfying the criteria; and transmitting, according to the transmission mode and while the UE is in the connected mode with the base station, a set of repetitions of the random access request message.

Aspect 2: The method of aspect 1, wherein selecting the transmission mode from the set of transmission modes further comprises: selecting from the set of transmission modes that includes transmission of the set of repetitions of the random access request message across multiple random access occasions, transmission of the set of repetitions of the random access request message on multiple component carriers, transmission of the set of repetitions of the random access request message on multiple frequency allocations associated with a same component carrier, or any combination thereof.

Aspect 3: The method of any of aspects 1 through 2, wherein selecting the transmission mode from the set of transmission modes further comprises: selecting from the set of transmission modes that includes transmission of the set of repetitions of the random access request message according to a random access format of a set of random access formats, transmission of the set of repetitions of the random access request message using a random access resource of a set of random access resources, or any combination thereof.

Aspect 4: The method of any of aspects 1 through 3, further comprising: receiving, from the base station, an indication of a preamble that is allocated to the UE for a contention-free random access procedure, wherein the random access request message comprises the preamble.

Aspect 5: The method of any of aspects 1 through 4, wherein selecting the transmission mode from the set of transmission modes further comprises: selecting from the set of transmission modes that includes transmission of the set of repetitions of the random access request message comprising the preamble and transmission of the set of repetitions of the random access request message comprising the preamble superimposed with a second preamble.

Aspect 6: The method of any of aspects 1 through 5, further comprising: transmitting, to the base station, capability information comprising an indication that the UE supports selection of the transmission mode, wherein receiving the control signaling comprising the indication of criteria for selection of the transmission mode is based at least in part on transmitting the capability information.

Aspect 7: The method of any of aspects 1 through 6, wherein receiving the control signaling comprises: receiving a radio resource control message comprising the indication of the criteria for selection of the transmission mode from the set of transmission modes.

Aspect 8: The method of any of aspects 1 through 7, further comprising: receiving system information comprising an initial set of values for the criteria for selection of the transmission mode from the set of transmission modes.

Aspect 9: The method of aspect 8, wherein receiving the control signaling comprises: receiving a radio resource control message comprising one or more offsets to the initial set of values for the criteria for selection of the transmission mode from the set of transmission modes.

Aspect 10: The method of any of aspects 1 through 9, further comprising: identifying, based at least in part on receiving the control signaling, a first subset of the criteria associated with a first type of random access procedure; and selecting the first subset of the criteria from the criteria based at least in part on a contention-free random access procedure being the first type of random access procedure, wherein selecting the transmission mode from the set of transmission modes is based at least in part on the one or more conditions satisfying the first subset of the criteria.

Aspect 11: The method of aspect 10, wherein the first type of random access procedure includes random access based at least in part on receiving one or more synchronization signal blocks or based at least in part on receiving one or more channel state information reference signals.

Aspect 12: The method of any of aspects 10 through 11, wherein the first type of random access procedure is a beam failure recovery procedure, a handover procedure, or a secondary cell group set up procedure.

Aspect 13: The method of any of aspects 1 through 12, wherein receiving the control signaling comprising the indication of criteria for selection of the transmission mode further comprises: receiving, as the criteria, a threshold measurement value for synchronization signal blocks, a power class of the UE, a number of previous unsuccessful random access transmission attempts, a CSI measurement report, or any combination thereof.

Aspect 14: A method for wireless communications at a base station, comprising: transmitting, to a UE, control signaling comprising an indication of criteria for selection of a transmission mode from a set of transmission modes for transmission of a random access request message while the UE is in a connected mode with the base station; monitoring for a set of repetitions of the random access request message based at least in part on one or more conditions satisfying the criteria; and receiving, from the UE based at least in part on the monitoring, the set of repetitions of the random access request message in accordance with the transmission mode.

Aspect 15: The method of aspect 14, wherein receiving the set of repetitions of the random access request message in accordance with the transmission mode further comprises: receiving the set of repetitions in accordance with one of the set of transmission modes which includes transmission of the set of repetitions of the random access request message across multiple random access occasions, transmission of the set of repetitions of the random access request message on multiple component carriers, transmission of the set of repetitions of the random access request message on multiple frequency allocations associated with a same component carrier, or any combination thereof.

Aspect 16: The method of any of aspects 14 through 15, wherein receiving the set of repetitions of the random access request message in accordance with the transmission mode further comprises: receiving the set of repetitions in accordance with one of the set of transmission modes which includes transmission of the set of repetitions of the random access request message according to a random access format of a set of random access formats, transmission of the set of repetitions of the random access request message using a random access resource of a set of random access resources, or any combination thereof.

Aspect 17: The method of any of aspects 14 through 16, further comprising: transmitting, to the UE, an indication of a preamble that is allocated to the UE for a contention-free random access procedure, wherein the random access request message comprises the preamble.

Aspect 18: The method of any of aspects 14 through 17, wherein receiving the set of repetitions of the random access request message in accordance with the transmission mode further comprises: receiving the set of repetitions in accordance with one of the set of transmission modes which includes transmission of the set of repetitions of the random access request message comprising the preamble and transmission of the set of repetitions of the random access request message comprising the preamble superimposed with a second preamble.

Aspect 19: The method of any of aspects 14 through 18, further comprising: receiving, from the UE, capability information comprising an indication that the UE supports selection of the transmission mode, wherein transmitting the control signaling comprising the indication of criteria for selection of the transmission mode is based at least in part on receiving the capability information.

Aspect 20: The method of any of aspects 14 through 19, wherein transmitting the control signaling comprises: transmitting a radio resource control message comprising the indication of the criteria for selection of the transmission mode from the set of transmission modes.

Aspect 21: The method of any of aspects 14 through 20, further comprising. transmitting system information comprising an initial set of values for the criteria for selection of the transmission mode from the set of transmission modes Aspect 22: The method of aspect 21, wherein transmitting the control signaling comprises: transmitting a radio resource control message comprising one or more offsets to the initial set of values for the criteria for selection of the transmission mode from the set of transmission modes.

Aspect 23: The method of any of aspects 14 through 22, further comprising: identifying, based at least in part on transmitting the control signaling, a first subset of the criteria associated with a first type of random access procedure; and selecting the first subset of the criteria from the criteria based at least in part on a contention-free random access procedure being the first type of random access procedure, wherein monitoring for the set of repetitions of the random access request message is based at least in part on the one or more conditions satisfying the first subset of the criteria.

Aspect 24: The method of aspect 23, wherein the first type of random access procedure includes random access based at least in part on receiving one or more synchronization signal blocks or based at least in part on receiving one or more channel state information reference signals.

Aspect 25: The method of any of aspects 23 through 24, wherein the first type of random access procedure is a beam failure recovery procedure, a handover procedure, or a secondary cell group set up procedure.

Aspect 26: An apparatus for wireless communications at a UE, comprising a processor; memory coupled with the processor; and instructions stored in the memory and executable by the processor to cause the apparatus to perform a method of any of aspects 1 through 13.

Aspect 27: An apparatus for wireless communications at a UE, comprising at least one means for performing a method of any of aspects 1 through 13.

Aspect 28: A non-transitory computer-readable medium storing code for wireless communications at a UE, the code comprising instructions executable by a processor to perform a method of any of aspects 1 through 13.

Aspect 29: An apparatus for wireless communications at a base station, comprising a processor; memory coupled with the processor; and instructions stored in the memory and executable by the processor to cause the apparatus to perform a method of any of aspects 14 through 25.

Aspect 30: An apparatus for wireless communications at a base station, comprising at least one means for performing a method of any of aspects 14 through 25.

Aspect 31: A non-transitory computer-readable medium storing code for wireless communications at a base station, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

transmitting, to a network entity, capability information comprising an indication that the UE supports selection of a transmission mode from a set of transmission modes for transmission of a random access request message while the UE is in a connected mode with the network entity;

receiving, from the network entity, control signaling comprising an indication of criteria for selection of the transmission mode from the set of transmission modes, wherein receiving the control signaling comprising the indication of the criteria for selection of the transmission mode is based at least in part on transmitting the capability information;

selecting the transmission mode from the set of transmission modes based at least in part on one or more conditions satisfying the criteria, wherein the set of transmission modes includes the transmission mode, and wherein a set of repetitions of the random access request message are to be transmitted on multiple component carriers; and transmitting, according to the transmission mode and while the UE is in the connected mode with the network entity, the set of repetitions of the random access request message.

2. The method of claim 1, wherein selecting the transmission mode from the set of transmission modes further comprises:
selecting from the set of transmission modes that includes transmission of the set of repetitions of the random access request message across multiple random access occasions, transmission of the set of repetitions of the random access request message on multiple frequency allocations associated with a same component carrier, or any combination thereof.

3. The method of claim 1, wherein selecting the transmission mode from the set of transmission modes further comprises:
selecting from the set of transmission modes that includes transmission of the set of repetitions of the random access request message according to a random access format of a set of random access formats, transmission of the set of repetitions of the random access request message using a random access resource of a set of random access resources, or any combination thereof.

4. The method of claim 1, further comprising:
receiving, from the network entity, an indication of a preamble that is allocated to the UE for a contention-free random access procedure, wherein the random access request message comprises the preamble.

5. The method of claim 1, wherein selecting the transmission mode from the set of transmission modes further comprises:
selecting from the set of transmission modes that includes transmission of the set of repetitions of the random access request message comprising a preamble and transmission of the set of repetitions of the random access request message comprising the preamble superimposed with a second preamble.

6. The method of claim 1, wherein receiving the control signaling comprises:
receiving a radio resource control message comprising the indication of the criteria for selection of the transmission mode from the set of transmission modes.

7. The method of claim 1, further comprising:
receiving system information comprising an initial set of values for the criteria for selection of the transmission mode from the set of transmission modes.

8. The method of claim 7, wherein receiving the control signaling comprises:
receiving a radio resource control message comprising one or more offsets to the initial set of values for the criteria for selection of the transmission mode from the set of transmission modes.

9. The method of claim 1, further comprising:
identifying, based at least in part on receiving the control signaling, a first subset of the criteria associated with a first type of a contention-free random access procedure; and
selecting the first subset of the criteria from the criteria based at least in part on u the first type of the contention-free random access procedure, wherein selecting the transmission mode from the set of transmission modes is based at least in part on the one or more conditions satisfying the first subset of the criteria.

10. The method of claim 9, wherein the first type of the contention-free random access procedure includes random access based at least in part on receiving one or more synchronization signal blocks or based at least in part on receiving one or more channel state information reference signals.

11. The method of claim 9, wherein the first type of the contention-free random access procedure is a beam failure recovery procedure, a handover procedure, or a secondary cell group set up procedure.

12. The method of claim 1, wherein receiving the control signaling comprising the indication of criteria for selection of the transmission mode further comprises:
receiving, as the criteria, a threshold measurement value for synchronization signal blocks, a power class of the UE, a number of previous unsuccessful random access transmission attempts, a CSI measurement report, or any combination thereof.

13. The method of claim 1, wherein the criteria for selection of the transmission mode is based on a type or purpose of a contention-free random access procedure.

14. A method for wireless communications at a network entity, comprising:
receiving, from a user equipment (UE), capability information comprising an indication that the UE supports selection of a transmission mode from a set of transmission modes for transmission of a random access request message while the UE is in a connected mode with the network entity;
transmitting, to the UE, control signaling comprising an indication of criteria for selection of the transmission mode from the set of transmission modes for transmission of a random access request message while the UE is in a connected mode with the network entity, wherein transmitting the control signaling comprising the indication of the criteria for selection of the transmission mode is based at least in part on receiving the capability information, and wherein a set of repetitions of the random access request message are to be transmitted on multiple component carriers;
monitoring for the set of repetitions of the random access request message based at least in part on one or more conditions satisfying the criteria; and
receiving, from the UE based at least in part on the monitoring, the set of repetitions of the random access request message in accordance with the transmission mode.

15. The method of claim 14, wherein receiving the set of repetitions of the random access request message in accordance with the transmission mode further comprises:

receiving the set of repetitions in accordance with one of the set of transmission modes which includes transmission of the set of repetitions of the random access request message across multiple random access occasions, transmission of the set of repetitions of the random access request message on multiple frequency allocations associated with a same component carrier, or any combination thereof.

16. The method of claim 14, wherein receiving the set of repetitions of the random access request message in accordance with the transmission mode further comprises:
receiving the set of repetitions in accordance with one of the set of transmission modes which includes transmission of the set of repetitions of the random access request message according to a random access format of a set of random access formats, transmission of the set of repetitions of the random access request message using a random access resource of a set of random access resources, or any combination thereof.

17. The method of claim 14, further comprising:
transmitting, to the UE, an indication of a preamble that is allocated to the UE for a contention-free random access procedure, wherein the random access request message comprises the preamble.

18. The method of claim 14, wherein receiving the set of repetitions of the random access request message in accordance with the transmission mode further comprises:
receiving the set of repetitions in accordance with one of the set of transmission modes which includes transmission of the set of repetitions of the random access request message comprising a preamble and transmission of the set of repetitions of the random access request message comprising the preamble superimposed with a second preamble.

19. The method of claim 14, wherein transmitting the control signaling comprises:
transmitting a radio resource control message comprising the indication of the criteria for selection of the transmission mode from the set of transmission modes.

20. The method of claim 14, further comprising:
transmitting system information comprising an initial set of values for the criteria for selection of the transmission mode from the set of transmission modes.

21. The method of claim 20, wherein transmitting the control signaling comprises:
transmitting a radio resource control message comprising one or more offsets to the initial set of values for the criteria for selection of the transmission mode from the set of transmission modes.

22. The method of claim 14, further comprising:
identifying, based at least in part on transmitting the control signaling, a first subset of the criteria associated with a first type of a contention-free random access procedure; and
selecting the first subset of the criteria from the criteria based at least in part on the first type of the contention-free random access procedure, wherein monitoring for the set of repetitions of the random access request message is based at least in part on the one or more conditions satisfying the first subset of the criteria.

23. The method of claim 22, wherein the first type of the contention-free random access procedure includes random access based at least in part on receiving one or more synchronization signal blocks or based at least in part on receiving one or more channel state information reference signals.

24. The method of claim 22, wherein the first type of the contention-free random access procedure is a beam failure recovery procedure, a handover procedure, or a secondary cell group set up procedure.

25. An apparatus for wireless communications at a user equipment (UE), comprising:
a processor;
memory coupled with the processor; and
instructions stored in the memory and executable by the processor to cause the apparatus to:
transmit, to a network entity, capability information comprising an indication that the UE supports selection of a transmission mode from a set of transmission modes for transmission of a random access request message while the UE is in a connected mode with the network entity;
receive, from the network entity, control signaling comprising an indication of criteria for selection of the transmission mode from the set of transmission modes for transmission, wherein the reception of the control signaling comprising the indication of the criteria for selection of the transmission mode is based at least in part on the transmission of the capability information;
select the transmission mode from the set of transmission modes based at least in part on one or more conditions satisfying the criteria, wherein the set of transmission modes includes the transmission mode, and wherein a set of repetitions of the random access request message are to be transmitted on multiple component carriers; and
transmit, according to the transmission mode and while the UE is in the connected mode with the network entity, the set of repetitions of the random access request message.

26. The apparatus of claim 25, wherein the instructions to select the transmission mode from the set of transmission modes are further executable by the processor to cause the apparatus to:
select from the set of transmission modes that includes transmission of the set of repetitions of the random access request message across multiple random access occasions, transmission of the set of repetitions of the random access request message on multiple frequency allocations associated with a same component carrier, or any combination thereof.

27. The apparatus of claim 25, wherein the instructions to select the transmission mode from the set of transmission modes are further executable by the processor to cause the apparatus to:
select from the set of transmission modes that includes transmission of the set of repetitions of the random access request message according to a random access format of a set of random access formats, transmission of the set of repetitions of the random access request message using a random access resource of a set of random access resources, or any combination thereof.

28. The apparatus of claim 25, wherein the instructions are further executable by the processor to cause the apparatus to:
receive, from the network entity, an indication of a preamble that is allocated to the UE for the contention-free random access procedure, wherein the random access request message comprises the preamble.

29. An apparatus for wireless communications at a network entity, comprising:
a processor;

memory coupled with the processor; and
instructions stored in the memory and executable by the processor to cause the apparatus to:
receive, from a user equipment (UE), capability information comprising an indication that the UE supports selection of a transmission mode from a set of transmission modes for transmission of a random access request message while the UE is in a connected mode with the network entity;
transmit, to the UE, control signaling comprising an indication of criteria for selection of a transmission mode from a set of transmission modes for transmission of a random access request message while the UE is in a connected mode with the network entity, wherein the transmission of the control signaling comprising the indication of the criteria for selection of the transmission mode is based at least in part on the reception of the capability information, and wherein a set of repetitions of the random access request message are to be transmitted on multiple component carriers;
monitor for the set of repetitions of the random access request message based at least in part on one or more conditions satisfying the criteria; and
receive, from the UE based at least in part on the monitoring, the set of repetitions of the random access request message in accordance with the transmission mode.

30. The method of claim 14, wherein the criteria for selection of the transmission mode is based on a type or purpose of a contention-free random access procedure.

\* \* \* \* \*